(12) United States Patent
Gadnis et al.

(10) Patent No.: US 12,113,781 B2
(45) Date of Patent: Oct. 8, 2024

(54) MANAGING PERMISSIONS TO ACCESS USER DATA IN A DISTRIBUTED LEDGER TRUST NETWORK

(71) Applicant: BanQu, Inc., Minnetonka, MN (US)

(72) Inventors: Ashish Gadnis, Austin, TX (US); Jeffrey A. Keiser, Minnetonka, MN (US); Stanislav S. Natalenko, Kharkov (UA)

(73) Assignee: BanQu, Inc., Minnetonka, MN (US)

( * ) Notice: Subject to any disclaimer, the term of this patent is extended or adjusted under 35 U.S.C. 154(b) by 546 days.

(21) Appl. No.: 17/293,396

(22) PCT Filed: Nov. 12, 2019

(86) PCT No.: PCT/US2019/061008
§ 371 (c)(1),
(2) Date: May 12, 2021

(87) PCT Pub. No.: WO2020/102246
PCT Pub. Date: May 22, 2020

(65) Prior Publication Data
US 2022/0052988 A1 Feb. 17, 2022

Related U.S. Application Data

(60) Provisional application No. 62/760,789, filed on Nov. 13, 2018.

(51) Int. Cl.
*H04L 9/40* (2022.01)
*H04L 9/08* (2006.01)
(Continued)

(52) U.S. Cl.
CPC ............ *H04L 63/062* (2013.01); *H04L 9/088* (2013.01); *H04L 9/3213* (2013.01);
(Continued)

(58) Field of Classification Search
CPC ... H04L 63/062; H04L 63/0428; H04L 63/08; H04L 63/10; H04L 9/3213; H04L 9/3236; H04L 67/02
(Continued)

(56) References Cited

U.S. PATENT DOCUMENTS 8,316,237 B1 * 11/2012 Felsher ................. H04L 63/061
   380/282
8,752,197 B2 * 6/2014 Bolle .................... G06T 1/0021
   726/28

(Continued)

FOREIGN PATENT DOCUMENTS

CA 2623137 11/2009
CN 108632284 10/2018
(Continued)

OTHER PUBLICATIONS

Acceptance Letter, from Nigerian Patent Application No. NG/PT/C/2021/5441, 3 pp.
(Continued)

*Primary Examiner* — Dant B Shaifer Harriman
(74) *Attorney, Agent, or Firm* — Klarquist Sparkman, LLP

(57) ABSTRACT

Mechanisms to manage permissions to access user data in a distributed ledger trust network ("DLTN") are described. A given user can share access to user data in a fine-grained way. Access to user data can depend on the category of the user data and/or the role of another user (e.g., whether the other user is recognized as a connection). Access to user data can be limited in duration. Permissions to access user data can be set proactively or reactively. A protocol allows a potential reviewer to request access to the user data of a given user, with the given user selectively approving or rejecting access by the reviewer. In this way, a given user can control access to user data in the DLTN, selectively
(Continued)

granting (or revoking) access to some of the user data or all of the user data, by selected other users or by all other users.

25 Claims, 21 Drawing Sheets

(51) Int. Cl.
*H04L 9/32* (2006.01)
*H04L 67/02* (2022.01)
*H04L 9/00* (2022.01)

(52) U.S. Cl.
CPC ........ *H04L 9/3236* (2013.01); *H04L 63/0428* (2013.01); *H04L 63/08* (2013.01); *H04L 63/10* (2013.01); *H04L 67/02* (2013.01); *H04L 9/50* (2022.05)

(58) Field of Classification Search
USPC .......................................................... 713/193
See application file for complete search history.

(56) References Cited

U.S. PATENT DOCUMENTS

| | | | |
|---|---|---|---|
| 9,961,155 B1 | 5/2018 | Chan | |
| 10,250,694 B2* | 4/2019 | Mankovskii | H04L 67/535 |
| 10,956,582 B1* | 3/2021 | Vessenes | H04L 9/085 |
| 11,145,391 B1* | 10/2021 | Mirica | G16H 10/20 |
| 2003/0191703 A1 | 10/2003 | Chen et al. | |
| 2005/0157878 A1* | 7/2005 | Matsushita | H04N 21/2585 |
| | | | 348/E7.06 |
| 2009/0002333 A1 | 1/2009 | Maxwell et al. | |
| 2014/0047237 A1* | 2/2014 | Parrish | H04L 9/065 |
| | | | 713/168 |
| 2014/0136847 A1 | 5/2014 | Huang | |
| 2016/0005032 A1 | 1/2016 | Yau et al. | |
| 2016/0117709 A1 | 4/2016 | Postrel | |
| 2016/0261411 A1 | 9/2016 | Yau et al. | |
| 2017/0140375 A1 | 5/2017 | Kunstel | |
| 2018/0060496 A1* | 3/2018 | Bulleit | H04L 9/0643 |
| 2018/0225640 A1 | 8/2018 | Chapman et al. | |
| 2018/0239897 A1* | 8/2018 | Ventura | G06F 21/57 |
| 2018/0285594 A1 | 10/2018 | Jarvis et al. | |
| 2018/0287800 A1 | 10/2018 | Chapman et al. | |
| 2019/0251278 A1* | 8/2019 | Kalinichenko | H04L 9/0825 |
| 2019/0349486 A1* | 11/2019 | Ohara | H04N 1/4413 |
| 2019/0370866 A1* | 12/2019 | Lawbaugh | G06Q 30/0277 |
| 2020/0226285 A1* | 7/2020 | Bulleit | G06F 21/33 |
| 2021/0135857 A1* | 5/2021 | Parvataneni | H04L 67/104 |

FOREIGN PATENT DOCUMENTS

| | | |
|---|---|---|
| EP | 2759123 B1 | 8/2018 |
| KR | 10-2015-0005837 | 1/2015 |
| KR | 10-1897032 | 9/2018 |
| WO | WO 2009/012229 | 1/2009 |
| WO | WO 2017/136879 A1 | 8/2017 |
| WO | WO 2018/014123 | 1/2018 |
| WO | WO 2018/126059 | 7/2018 |

OTHER PUBLICATIONS

Notification of the Substantive Examination Report dated Mar. 7, 2023, from Saudi Arabian Patent Application No. 521422017, 20 pp.
Official Action I dated May 2, 2023, from Indonesian Patent Application No. P00202104255, 3 pp. [No English translation].
Extended European Search Report dated Jul. 20, 2022, including Supplementary European Search Report, from European Patent Application No. 19885504.1, 14 pp.
Hossein et al., "Droplet: Decentralized Authorization for IoT Data Streams," arXiv.org:1806.02057v2 [cs.CR], pp. 1-19 (Nov. 14, 2018).
International Search Report and Written Opinion dated Apr. 9, 2020, from International Patent Application No. PCT/US2019/061008, 9 pp.
Acceptance of Complete Specification dated Aug. 22, 2022, from South African Patent Application No. 2021/03185, 1 p.
Communication pursuant to Rules 70(2) and 70a(2) EPC dated Aug. 9, 2022, from European Patent Application No. 19885504.1, 1 p.
First Examination Report dated Dec. 29, 2022, from Indian Patent Application No. 202117025744, 5 pp.
International Preliminary Report on Patentability dated May 18, 2021, from International Patent Application No. PCT/US2019/061008, 7 pp.
Office Action dated Nov. 25, 2022, from ARIPO Patent Application No. AP/P/2021/013241, 4 pp.
First Office Action dated Oct. 7, 2023, from Chinese Patent Application No. 2019800887904, 16 pp.
Notification of Decision to Grant dated Nov. 10, 2023, from ARIPO Patent Application No. AP/P/2021/013241, 5 pp.
Office Action dated Dec. 28, 2023, from Colombian Patent Application No. NC2021/0007714, 15 pp. [No English translation].
Communication pursuant to Article 94(3) EPC dated Apr. 29, 2024, from European Patent Application No. 19885504.1, 6 pp.
Office Action dated May 24, 2024, form Colombian Patent Application No. NC2021/0007714, 15 pp. [No English translation].
Office Action dated Apr. 30, 2024, from Chinese Patent Application No. 201980088790.4, 6 pp.
Examination Report and Search Report dated Jul. 20, 2024, from United Arab Emirates Patent Application No. P6000775/2021, 9 pp.

* cited by examiner

FIG. 1
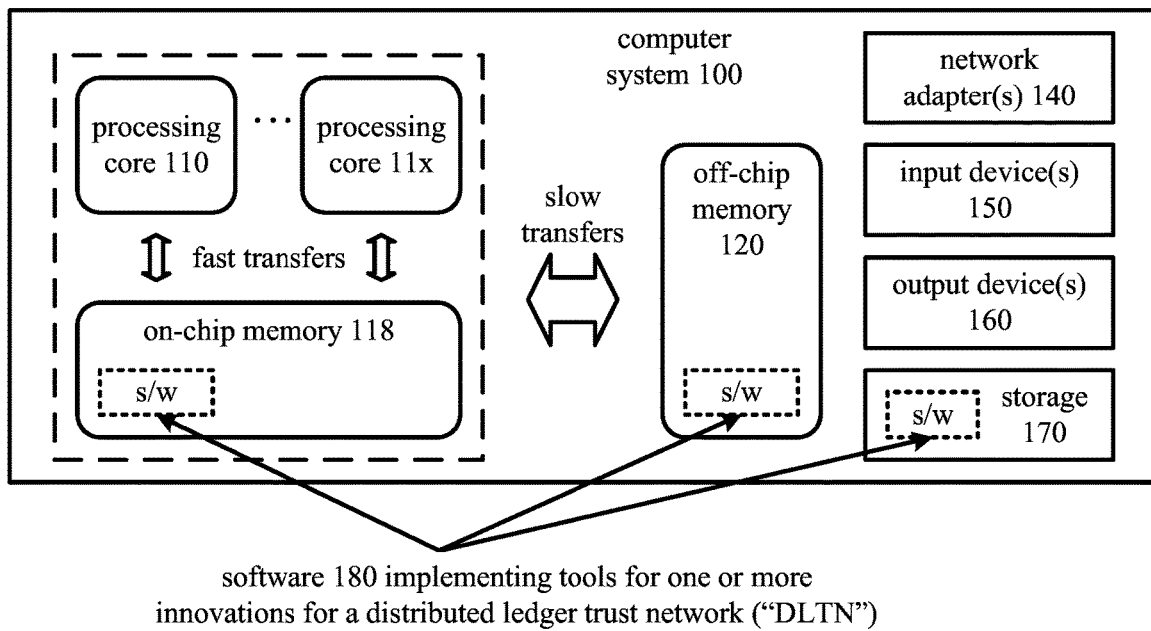
software 180 implementing tools for one or more innovations for a distributed ledger trust network ("DLTN")
FIG. 2    200
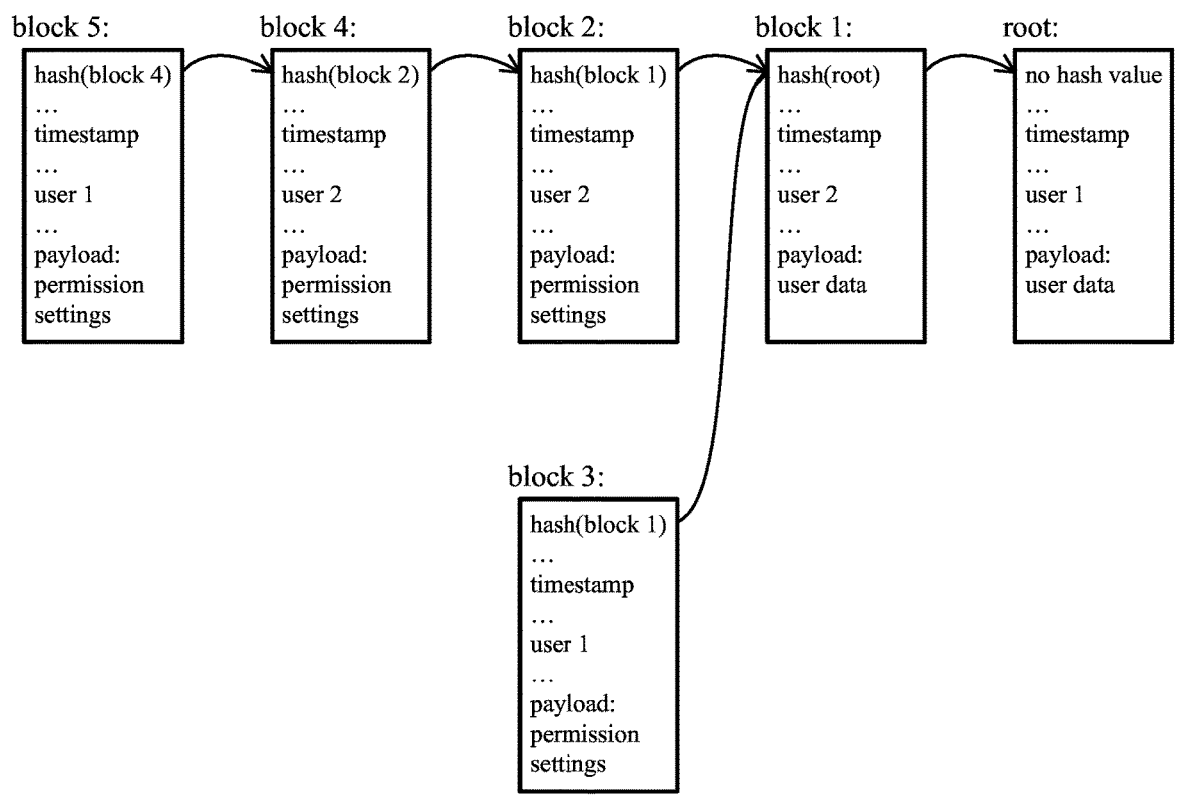

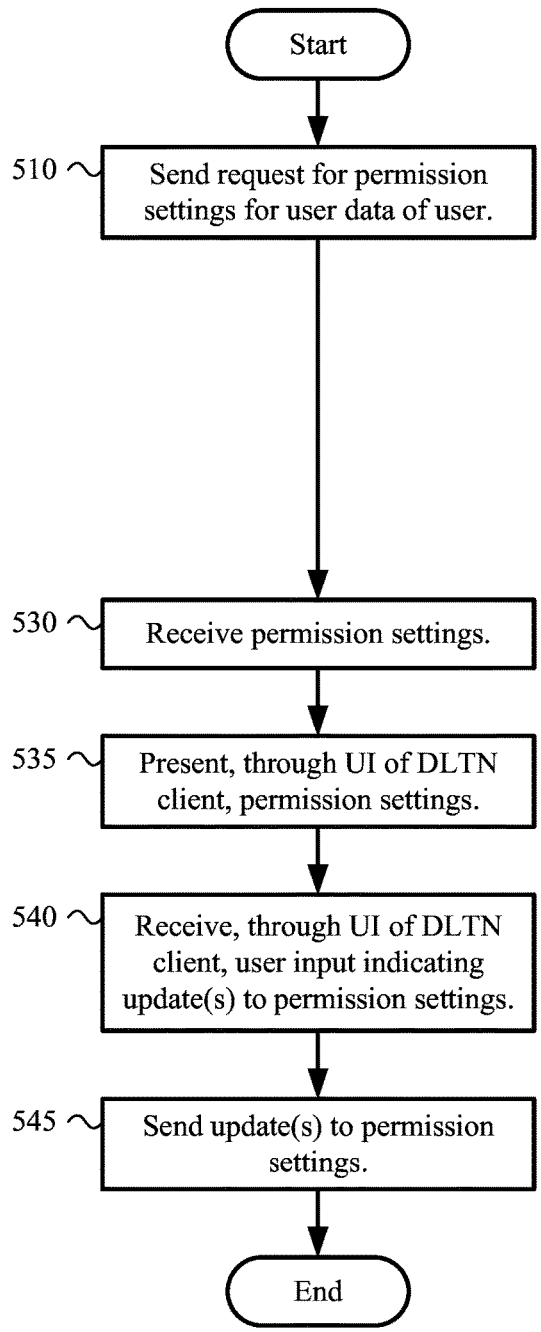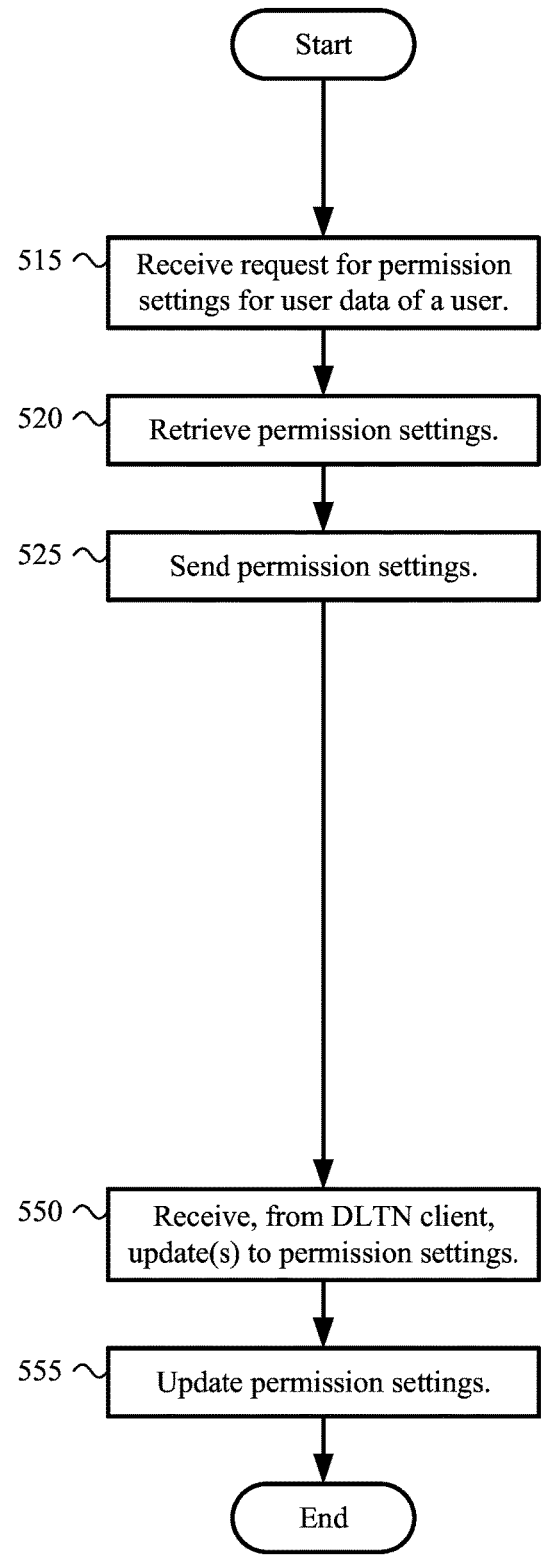

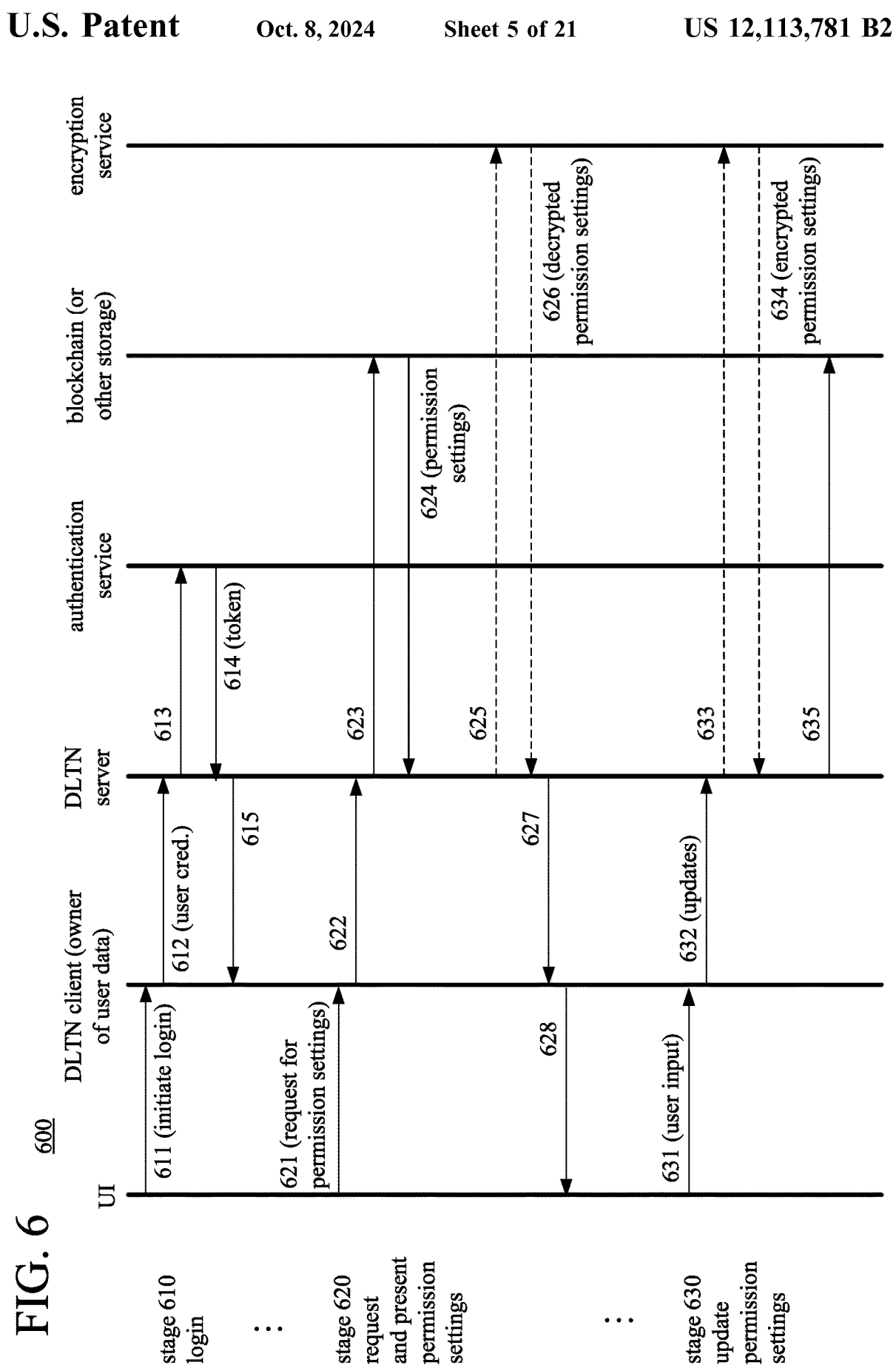

At DLTN client (reviewer):

At DLTN server:

At DLTN client (user):

At DLTN server:

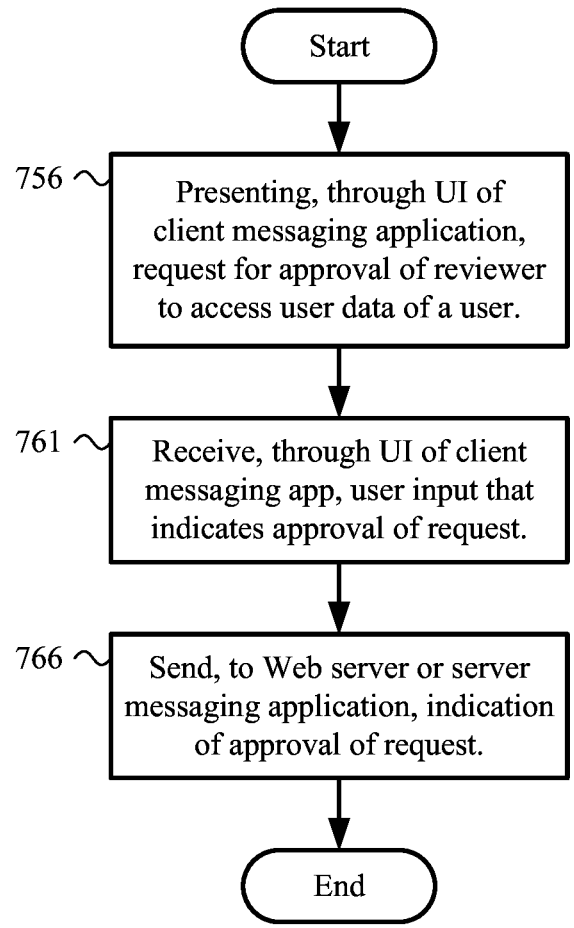

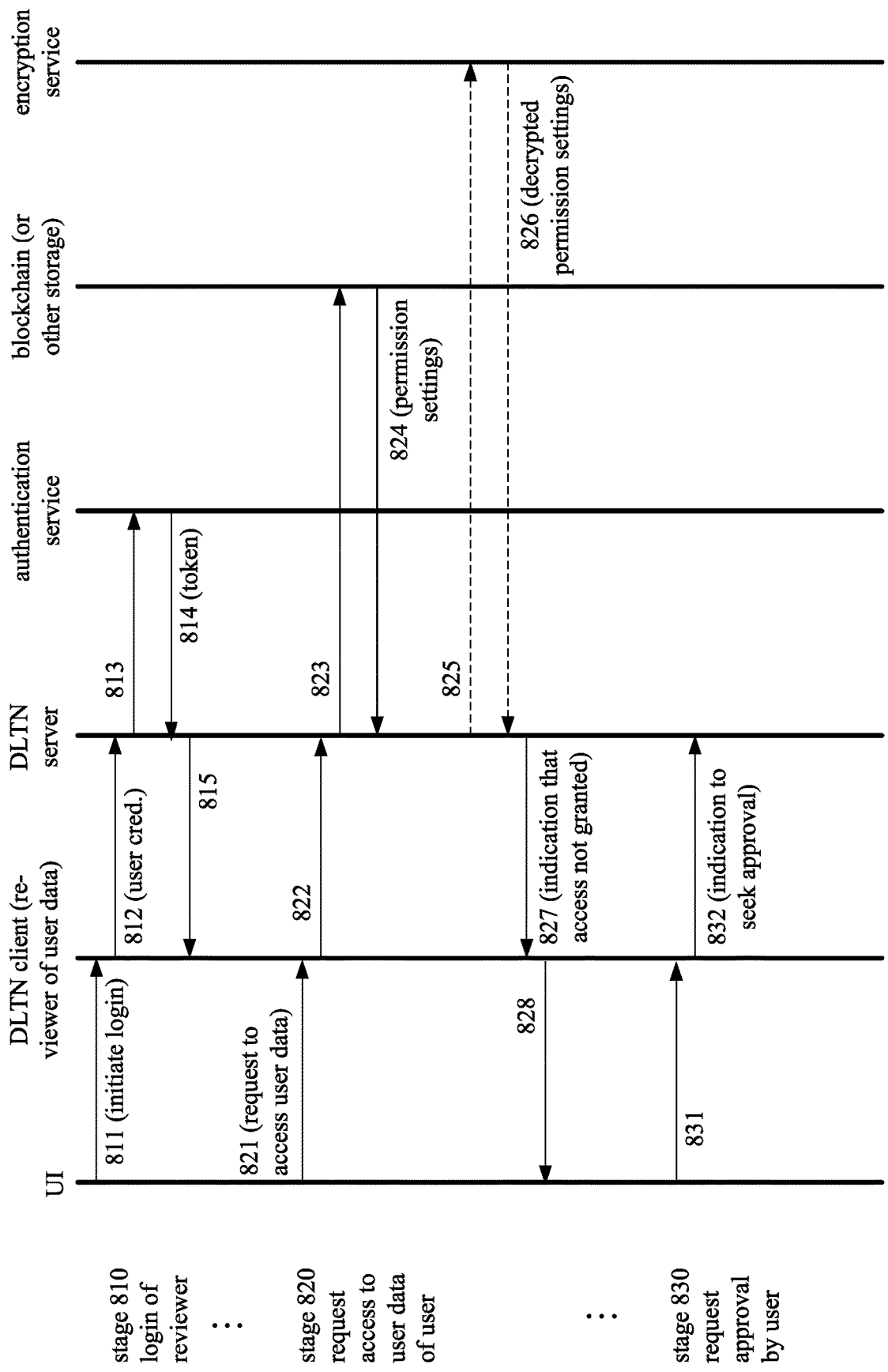

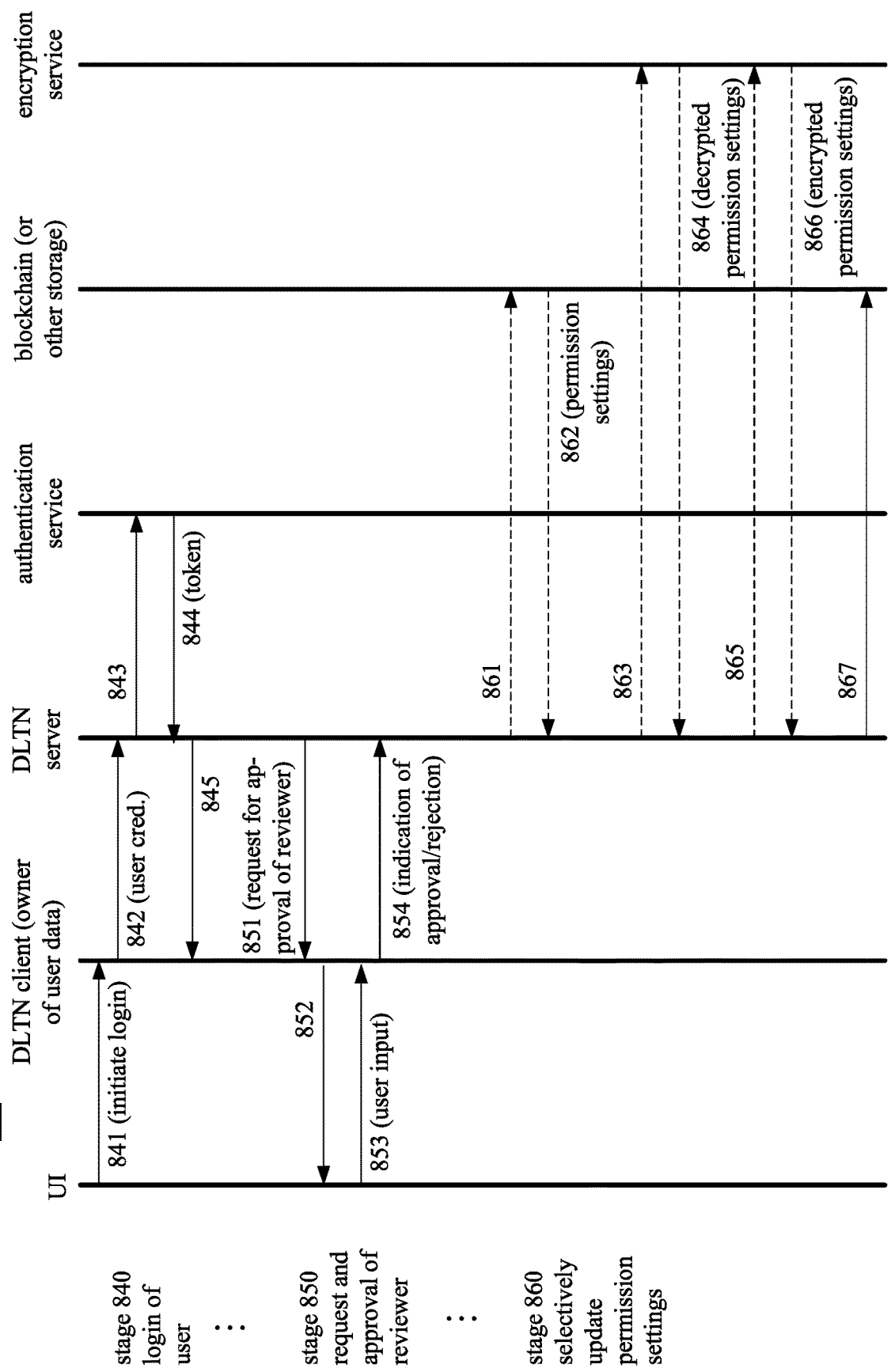

FIG. 11c

MANAGING PERMISSIONS TO ACCESS USER DATA IN A DISTRIBUTED LEDGER TRUST NETWORK

RELATED APPLICATION INFORMATION

This application is the U.S. National Stage of International Application No. PCT/US2019/061008, filed Nov. 12, 2019, and titled "MANAGING PERMISSIONS TO ACCESS USER DATA IN A DISTRIBUTED LEDGER TRUST NETWORK," which was published in English under PCT Article 21(2), which in turn claims the benefit of U.S. Provisional Patent Application No. 62/760,789, filed on Nov. 13, 2018, and titled "ENHANCEMENTS FOR DISTRIBUTED LEDGER TRUST NETWORK,". The provisional application is incorporated herein in its entirety.

FIELD

Enhancements for a distributed ledger trust network ("DLTN"). Some of the enhancements relate to mechanisms used to manage access to user data in a DLTN.

BACKGROUND

Blockchain technology has been used in contexts such as banking, cryptocurrency exchange, and smart contracts. Typically, blockchain technology provides a distributed ledger that records transactions in a verifiable, permanent way. A blockchain can be distributed across a network of computer systems called nodes. The nodes follow a protocol for communication between nodes, adding new blocks to the blockchain, and approving ("validating") the new blocks.

In general, a blockchain is dynamically-growing list of records, called blocks, in a chain. A given block is logically linked to the previous block in the blockchain. For example, a hash value is computed by applying a cryptographic hash function to the data of the previous block, and the hash value is stored in the given block. The given block also includes other fields such as a timestamp and payload data (sometimes called transaction data). The payload data typically represents one or more transactions but more generally can be any kind of data. As a rule, once a given block is added to the blockchain, data in the given block cannot be later modified because any subsequent blocks depend on the data in the given block. (To retroactively alter data in the given block, the subsequent blocks in the blockchain must also be altered, requiring a level of consensus within the blockchain network that is impossible or impractical to achieve.) The integrity of the blockchain can be verified by re-computing hash values for the respective blocks in the blockchain and comparing those re-computed hash values to the previously-computed hash values that logically link the blocks.

In some cases, multiple blocks can be produced concurrently and added to the same previous block in the blockchain. This temporarily creates a fork in the blockchain. The nodes of the blockchain network follow a protocol to rank ("score") the different branches of the fork, such that one of the branches (with the highest score) is followed by all nodes. In this way, the size of non-favored branches of the blockchain is limited. Nodes supporting the blockchain share versions of the blockchain and retain the version with the highest score. Various incentives are implemented to reduce the likelihood of a version of the blockchain being superseded, the longer that version of the blockchain is used.

By storing the blockchain across nodes of the blockchain network, risks of data loss associated with storing data in a single, centralized location are mitigated. Depending on implementation, each node in a blockchain network can store a complete or partial copy of the blockchain.

In a public blockchain (also called a permissionless blockchain), blocks of the blockchain are accessible to the participants in the blockchain network, without permission. Any participant in the blockchain network can access blocks in the blockchain, verify blocks of the blockchain, add new blocks to the blockchain, and validate the new blocks of the blockchain. Access control is not used in a public blockchain. In contrast, in a private blockchain (also called a permissioned blockchain), a central authority controls access to the blockchain network. That is, the central authority controls which participants can access blocks in the blockchain, verify blocks of the blockchain, add new blocks to the blockchain, and validate the new blocks of the blockchain.

In previous approaches to implementing a private blockchain, a given user can add data about the given user to the blockchain. For example, the user data may be biographical information about the given user or data about transactions to which the given user is a party. The given user has very limited options, however, with respect to controlling access by other users to the user data of the given user in the blockchain, which can result in exposure of the user data of the given user in a way that is inconsistent with the desires of the given user.

SUMMARY

In summary, the detailed description presents various innovations for mechanisms used to manage permissions to access user data in a distributed ledger trust network ("DLTN"). With such innovations, a given user can share access to user data of the given user (e.g., biographical data, contact data, identification documents, transaction data, etc.) in a fine-grained way. For example, access to user data can depend on the category of the user data. Or, as another example, access to user data can depend on the role of the other user (e.g., whether the other user is recognized as a connection of the given user). Further, access to user data can be limited in duration, so that permission to access the user data expires after some period of time. The given user can proactively set permissions to access user data, or the given user can reactively set permissions to access the user data. For example, a protocol is described that allows a potential reviewer to request access to the user data of a given user, with the given user selectively approving or rejecting access by the reviewer through any of various channels. In this way, in some example implementations, a given user can control access to the user data of the given user in the DLTN, selectively granting (or revoking) access to some of the user data or all of the user data, by selected other users or by all other users.

The innovations described herein include, but are not limited to, the innovations covered by the claims. The innovations can be implemented as part of a method, as part of a computer system configured to perform the method, or as part of non-transitory computer-readable media storing computer-executable instructions for causing one or more processors in a computer system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 1 is a diagram illustrating an example computer system in which some described examples can be implemented.

FIG. 2 is a diagram illustrating an example blockchain.

FIGS. 5a and 5b are flowcharts illustrating aspects of a generalized technique for updating permission settings for user data of a given user in a DLTN.

FIG. 6 is a protocol diagram illustrating an example approach to updating permission settings for user data of a given user in a DLTN.

FIGS. 7a-7e are flowcharts illustrating aspects of a generalized technique for requesting and approving access to user data of a given user in a DLTN.

FIGS. 8a and 8b are protocol diagrams illustrating an example approach to requesting and approving access to user data of a given user in a DLTN.

FIGS. 11a-11j are diagrams of example screenshots illustrating different features of managing permission settings for user data of a given user in a DLTN.

DETAILED DESCRIPTION

Figure 3:
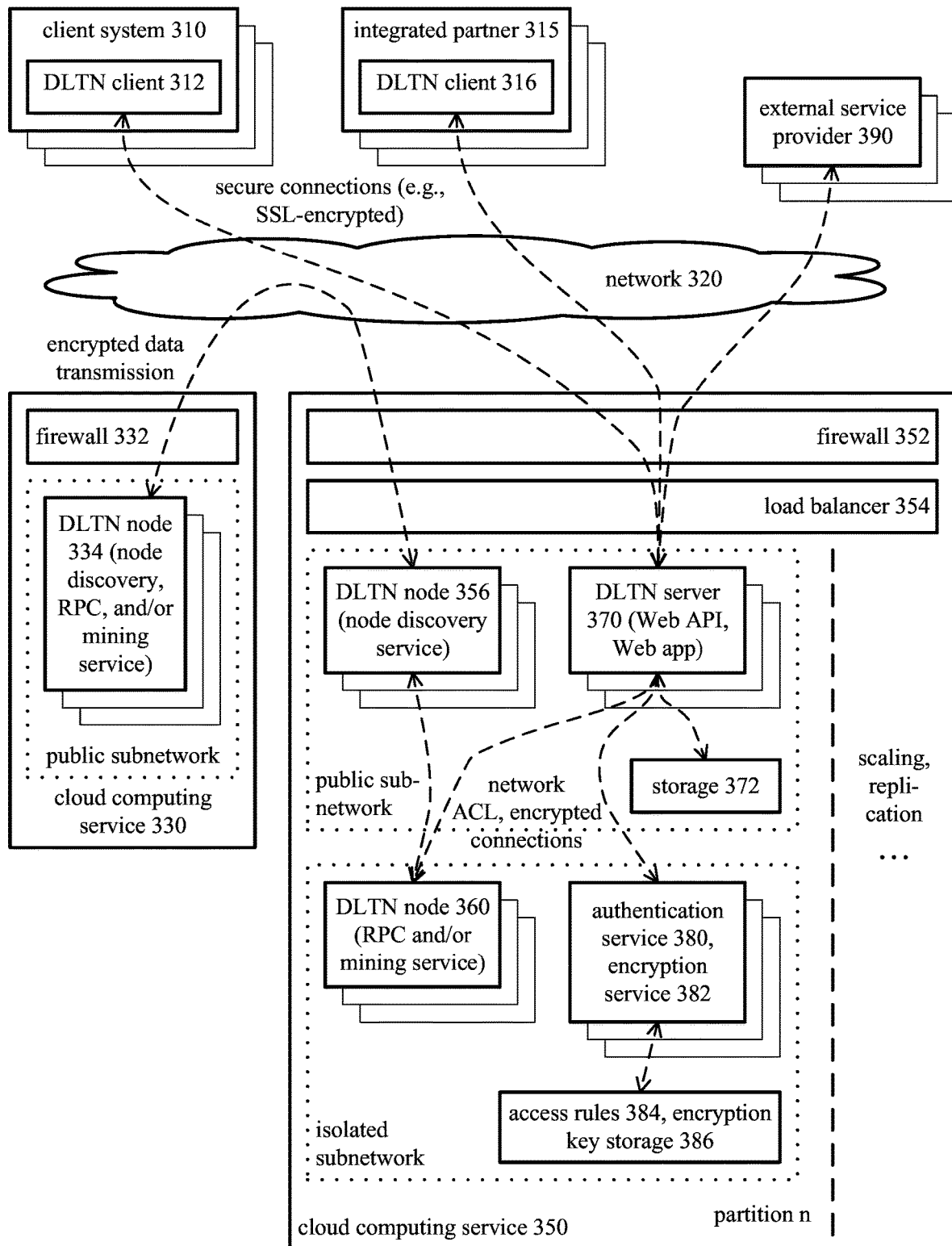
FIG. 3 is a diagram illustrating an example architecture for managing a private blockchain in a DLTN.

The detailed description presents various innovations for a distributed ledger trust network ("DLTN"). Some of the innovations described herein relate to mechanisms used to manage permissions to access user data in a DLTN.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense. Rather, the scope of the present invention is defined by the appended claims.

I. Example Computer Systems.

FIG. 1 illustrates a generalized example of a suitable computer system (100) in which several of the described innovations may be implemented. The innovations described herein relate to enhancements for a DLTN. Aside from its use in a DLTN, the computer system (100) is not intended to suggest any limitation as to scope of use or functionality, as the innovations may be implemented in diverse computer systems, including special-purpose computer systems adapted for operations in a DLTN.

With reference to FIG. 1, the computer system (100) includes one or more processing cores (110 . . . 11x) of a central processing unit ("CPU") and local, on-chip memory (118). The processing core(s) (110 . . . 11x) execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11x).

The local memory (118) can store software (180) implementing tools for innovations for a DLTN, for operations performed by the respective processing core(s) (110 . . . 11x), in the form of computer-executable instructions. In FIG. 1, the local memory (118) is on-chip memory such as one or more caches, for which access operations, transfer operations, etc. with the processing core(s) (110 . . . 11x) are fast.

The computer system (100) can include processing cores (not shown) and local memory (not shown) of a graphics processing unit ("GPU"). Alternatively, the computer system (100) includes one or more processing cores (not shown) of a system-on-a-chip ("SoC"), application-specific integrated circuit ("ASIC") or other integrated circuit, along with associated memory (not shown). The processing core(s) can execute computer-executable instructions for one or more innovations for a DLTN.

More generally, the term "processor" may refer generically to any device that can process computer-executable instructions and may include a microprocessor, microcontroller, programmable logic device, digital signal processor, and/or other computational device. A processor may be a CPU or other general-purpose unit, however, it is also known to provide a specific-purpose processor using, for example, an ASIC or a field-programmable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes shared memory (120), which may be volatile memory (e.g., RAM), non-volatile memory (e.g., ROM, EEPROM, flash memory, etc.), or some combination of the two, accessible by the processing core(s). The memory (120) stores software (180) implementing tools for one or more innovations for a DLTN, for operations performed, in the form of computer-executable instructions. In FIG. 1, the shared memory (120) is off-chip memory, for which access operations, transfer operations, etc. with the processing cores are slower.

The computer system (100) includes one or more network adapters (140). As used herein, the term network adapter indicates any network interface card ("NIC"), network interface, network interface controller, or network interface device. The network adapter(s) (140) enable communication over a network to another computing entity (e.g., server, other computer system). The network can be a wide area network, local area network, storage area network or other network. The network adapter(s) (140) can support wired connections and/or wireless connections, for a wide area network, local area network, storage area network or other network. The network adapter(s) (140) convey data (such as computer-executable instructions, audio or video input or output, or other data) in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) also includes one or more input device(s) (150). The input device(s) may be a touch input device such as a keyboard, mouse, pen, or trackball, a scanning device, or another device that provides input to the computer system (100). The computer system (100) can also include a video input, an audio input, a motion sensor/tracker input, and/or a game controller input.

The computer system (100) includes one or more output devices (160). The output device(s) (160) may be a printer, CD-writer, video output, audio output, or another device that provides output from the computer system (100).

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing one or more innovations for a DLTN.

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hardwired circuitry or custom hardware (e.g., an ASIC) may be used in place of, or in combination with, software instructions. Thus, examples are not limited to any specific combination of hardware and software.

The term "computer-readable medium" refers to any medium that participates in providing data (e.g., instructions) that may be read by a processor and accessed within a computing environment. A computer-readable medium may take many forms, including but not limited to non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, Digital Versatile Disc ("DVD"), any other optical medium, RAM, programmable read-only memory ("PROM"), erasable programmable read-only memory ("EPROM"), a USB memory stick, any other memory chip or cartridge, or any other medium from which a computer can read. The term "computer-readable memory" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Blockchains.

FIG. 2 shows an example blockchain (200), which is simplified for the sake of illustration. The blockchain (200) can be replicated between different nodes of a blockchain network. Each of the nodes can store a complete or partial copy of the blockchain (200). The blockchain (200) includes multiple blocks, starting from a root block and dynamically growing as blocks are added to the blockchain. Each of the blocks includes a header and payload data.

The header for a block includes multiple fields. Except for the root block, the header includes a hash value computed by applying a cryptographic hash function to the data of the previous block in the blockchain (200). In this way, a given block is logically linked to the previous block in the blockchain. For example, the hash value for block 1 is computed by applying the cryptographic hash function to the data of the root block, the hash value for block 2 is computed by applying the cryptographic hash function to the data of block 1, and so on. The integrity of the blockchain (200) can be verified by re-computing hash values for the respective blocks in the blockchain (200) and comparing those re-computed hash values to the previously-computed hash values (in headers) that logically link the blocks. In this way, the payload data in the blockchain (200) can be verified.

The header for a block also includes a timestamp and user identifier ("ID") for the user associated with the block (e.g., the owner of the payload data). Other fields of the header depend on implementation and, for the sake of simplicity, are not shown. For example, the fields can include a key ID that identifies the encryption key used to encrypt the payload data in the block and a category ID that identifies the category of the payload data in the block. In general, the fields of the header depend on the rules defined for the DLTN.

The blockchain (200) is used as primary storage for various types of data. The blockchain (200) can be shared—there is no central database that always stores data or central administrator who owns and controls the data. The payload data (sometimes called transaction data) is arbitrary data. In some blocks of the blockchain (200), the payload data is user data for a user (e.g., for one or more transactions, contact data, biographical data, identification documents), where the user data can include static data and/or dynamic data. In some other blocks of the blockchain (200), the payload data is permission settings, which can be set as explained in sections III and IV. More generally, the payload data can be any kind of data.

In the example of FIG. 2, payload data in a given block is "owned" by the user specified by the user ID in the given block. Permission settings for the user, which can be stored in the blockchain (200) as in FIG. 2 or stored outside the blockchain, are used to control access to the user data of the user. The payload data in the blockchain (200) can be encrypted by encryption keys that are user-specific (for the respective owners of the payload data) and context-specific (e.g., depending on access privileges). Thus, the blockchain (200) can include different encrypted versions of the same payload data, which can be made accessible to different sets of users.

Due to successive application of the cryptographic hash function to compute the hash values that logically link blocks in the blockchain (200), a block depends on the data (including hash values) of earlier blocks in the blockchain (200). As a rule, once a block is added to the blockchain (200), data in the block cannot be later modified. To retroactively alter data in the block, subsequent blocks in the blockchain must also be altered, requiring a level of consensus within the blockchain network that may be impossible or impractical to achieve.

In some cases, multiple blocks can be produced concurrently and added to the same previous block in the blockchain (200). In FIG. 2, block 2 and block 3 were produced concurrently and added from block 1 in the blockchain (200). This temporarily creates a fork in the blockchain (200). A protocol is followed to rank ("score") the different branches of the fork, such that one of the branches (with the highest score) is followed by all nodes. In FIG. 2, block 2 has a higher score than block 3, so subsequent blocks are added from block 2. Nodes in the blockchain network share versions of the blockchain (200) and retain the version with the highest score. Various incentives are implemented to reduce the likelihood of a version of the blockchain (200) being superseded, the longer that version of the blockchain (200) is used.

In many of the examples described herein, the blockchain is a private, permissioned blockchain. In some examples, however, the blockchain can instead be a public blockchain.

For the sake of simplicity, FIG. 2 shows a blockchain (200) in which all blocks are logically linked (e.g., with hash values for the respective blocks) in a single chain. Alternatively, a set of separate chains of blocks can be used in place of a single blockchain, e.g., logically linking blocks of user data in one chain, logically linking blocks of permission settings in another chain. As used herein, the term "a blockchain" or "the blockchain" includes blocks logically linked into one or more chains that are managed by a blockchain platform.

III. Example Architectures.

FIG. 3 shows an example architecture (300) for managing a private blockchain in a DLTN. In the example architecture (300) various entities are configured to communicate over a network (320) such as the Internet.

One or more client systems (310) each include a DLTN client (312) for the DLTN. The user of the DLTN client (312) can be an individual person, a small business, a large business, a bank, a non-profit organization, a government agency, or another entity. A client system (310) can be a personal computer, laptop computer, smartphone, or other type of computing device.

In FIG. 3, each of one or more integrated partner systems (315) also includes a DLTN client (316) for the DLTN. Compared to the user of a client system (310), the user of an integrated partner system (315) potentially has enhanced privileges, permissions, or rights in the DLTN. For purposes of the innovations described herein, however, the DLTN client (316) for an integrated partner system (315) is essentially the same as the DLTN client (312) for a client system (310). An integrated partner system (315) can be a personal computer, laptop computer, smartphone, or other type of computing device.

A DLTN client (312, 316) is configured to interoperate with a DLTN server (370) for the DLTN over a secure connection (e.g., SSL-encrypted connection). In general, the DLTN client (312, 316) provides a client-side user interface ("UI") to the DLTN. The DLTN client (312, 316) can make other client-side decisions and manage client-side communication. The DLTN client (312, 316) can be implemented as a stand-alone executable (e.g., separate application). Or, the DLTN client (312, 316) can be implemented using client-side scripting logic or other control logic in a Web browser environment, executing at the client-side. Or, the DLTN client (312, 316) can be implemented as a set of functions of a Web browser to control client-facing scripting logic executed by the DLTN server, where the scripting logic executes at the DLTN server but is controlled client-side user input for navigation (e.g., clicks, data entry). Thus, the DLTN client (312, 316) can be implemented using conventional functions of a Web browser, which provide a "front end" to a Web application of the DLTN server. In some example implementations, the DLTN client (312, 316) is implemented using conventional Web browser functions, which control a client-facing script using JavaScript Object Notation ("JSON") to interoperate with the DLTN. Acting in conjunction with the DLTN server (370), the DLTN client (312, 316) is configured to allow a user to perform various actions. For example, through the DLTN client (312, 316), the user can: log in to the DLTN; manage a network of connections to other users of the DLTN; engage in transactions with other users in the DLTN; add, edit, or remove user data; edit permission settings for the user data of the user; request access to the user data of another user; grant or revoke access to the user data of the user in response to a request from another user; create a custom form to be shared with other users; provide data for a form shared by another user; or review, approve, reject or take some other action on a submitted form. In particular, the functionality of a DLTN client (312, 316) in various scenarios is described in section IV.

One or more external service providers (390) are configured to provide services to a DLTN server (370). An external service provider (390) is configured to interoperate with the DLTN server (370) over a secure connection (e.g., SSL-encrypted connection).

For example, the external service providers (390) can include one or more providers of communication services, which are configured to provide programmatic access to a DLTN server (370) for functionality to make and receive phone calls, send and receive text messages via SMS or another set of protocols, or perform other communication functions. In some example implementations, the external service providers (390) include Twilio, Clickatell, and Nexmo. In particular, the provider of communication services can allow the DLTN server (370) to communicate with a user via an alternative channel of communication (e.g., phone call and voice navigation menu; SMS messages) when rejecting or approving requests to grant access to user data of the user.

As another example, the external service providers (390) can include one or more providers of email services, which are configured provide programmatic access to a DLTN server (370) for functionality to send and receive emails. In some example implementations, the external service providers (390) include SendGrid. In particular, a provider of email services can allow the DLTN server (370) to communicate with a user via an alternative channel of communication (e.g., email) when sending requests to grant access to user data of the user.

In FIG. 3, cloud computing services (330, 350) host services that provide functionality for the DLTN. For example, the cloud computing services (330, 350) are provided through Microsoft Azure, Google Cloud, or Amazon Web Services. Although FIG. 3 shows two different providers (330, 350) for cloud computing services, alternatively, a single provider or more providers could be used to host services that provide functionality for the DLTN. Or, privately owned computing resources or a mix of privately owned computing resources and cloud computing services could be used to provide server-side functionality for the DLTN.

A cloud computing service (330, 350) can be configured to organize services into separate partitions, groups, etc. In this way, the cloud computing service (330, 350) can support scaling of the services and/or replication. A load balancer (354) can be configured to distribute traffic and workloads across partitions.

A firewall (332, 352) can be configured to monitor and control incoming network traffic and outgoing network traffic. The firewall (332, 352) can be configured to apply various security rules to establish a barrier between the network (320) and resources of the cloud computing service (330, 350). A cloud computing service (330, 350) can be configured to include one or more public subnetworks and one or more isolated (private) subnetworks. In general, a public subnetwork is accessible to the Internet. An isolated network is not accessible through the Internet, but instead is accessible through an access control list ("ACL") or other mechanisms managed by the cloud computing service (330, 350).

In some example implementations, services hosted in the cloud computing service (330, 350) are deployed in "containers" or executed in virtual machines. A container or virtual machine virtualizes access to resources, which are provided by the cloud computing service (330, 350). In some example implementations, services are deployed in Docker containers, which can be distributed across different locations.

The DLTN includes various specialized nodes, which are configured to perform different services according to the rules of the DLTN. For redundancy, the nodes can be distributed across one or more clouds provided through the cloud computing services (330, 350). For example, the DLTN uses Ethereum technology, which provides a blockchain-based distributed computing platform and operating system, potentially supporting smart contract functionality. Alternatively, the DLTN uses another technology (e.g., Eris:db, HydraChain, Hyperledger Fabric, Iroha, Sawtooth Lake, IBM Blockchain Platform, Multichain, Openchain, Cardano, Quorum, Stellar, Symbiont Assembly, BigChainDB, ChainCore, Corda, Credits, Domus Tower Blockchain, Elements Blockchain Platform,). As used herein, the terms "distributed ledger trust network" and "blockchain network" are interchangeable, and the term blockchain generally indicates any ledger of records (blocks) that are logically linked.

Nodes (334, 356, 360) of the DLTN provide various services. In general, a DLTN node can be configured to store (synchronize) data for the blockchain. Or, a DLTN node can be configured to validate transactions, before a new block is added to the blockchain. (In some example implementations, a block can be added to the blockchain without use of a cryptocurrency for payment. As such, the speed and security of transactions is not impacted by potential volatility of a cryptocurrency used in the DLTN. Alternatively, a cryptocurrency (e.g., Ether) can be used for payments within the DLTN. In such implementations, a DLTN node can be configured to mine for cryptocurrency used in the DLTN.) Or, a DLTN node can coordinate activity in the DLTN. In general, to add a block to the blockchain, a DLTN node approves (validates) the block and adds the block.

In FIG. 3, a DLTN node (356) hosted in a public subnetwork of the cloud computing service (350) provides a node discovery service. A node discovery service is used to locate nodes in the DLTN. In some example implementations, the DLTN node (356) is an Ethereum bootnode, which provides a lightweight service to locate nodes according to a node discovery protocol. As another example, a DLTN node (360) hosted in an isolated subnetwork of the cloud computing service (350) provides an RPC service and/or mining service. In some example implementations, the node (360) provides an Ethereum RPC service and/or Ether mining service. As another example, a DLTN node (334) hosted in a public subnetwork of the cloud computing service (330) provides a node discovery service, RPC service, and/or mining service. The DLTN nodes (334, 356) in the public subnetworks communicate via encrypted data transmission over the network (320). The DLTN node (360) in the isolated subnetwork communicates with the node (356) in the public subnetwork via a connection secured using network ACLs and encryption.

In some example implementations, the DLTN nodes (334, 356, 360) are Ethereum nodes implemented using Geth. Alternatively, the nodes use another implementation of Ethereum or use another DLTN technology. In some example implementations, the DLTN nodes (334, 356, 360) are deployed in Docker containers. Alternatively, the DLTN nodes (334, 356, 360) are deployed using another virtualization technology.

The architecture (300) includes one or more DLTN servers (370). A DLTN server (370) is configured to interoperate with one or more DLTN clients (312, 316) for the DLTN over a secure connection (e.g., SSL-encrypted connection). The DLTN server (370) is also configured to interoperate with one or more external service providers (390) over secure connections (e.g., SSL-encrypted connections). The DLTN server (370) can be implemented as a stand-alone executable, as a Web application (also called Web-based application), or in some other way. In some example implementations, the DLTN server (370) includes control logic executable to implement methods of an application programming interface ("API"), to provide Web application functionality, to make other server-side decisions, and to manage server-side communication. In these example implementations, the API is designed according to representational state transfer ("REST") principles. The API is designed to have predictable, resource-oriented uniform resource locators ("URLs") and to use HTTP response codes to indicate API errors. The API uses built-in HTTP features (such as HTTP verbs), which are typically understood by off-the-shelf HTTP clients. The API uses JSON for input and output. Web application components of the DLTN server (370) can be separate from API components of the DLTN server (370). For example, with respect to front-end components for interoperating with a DLTN client (312, 316), the DLTN server (370) can be implemented using a library (such as React, a JavaScript library) that provides functionality for building UIs, as well as a library (such as Redux, a JavaScript library) that provides functionality for managing application state. With respect to back-end components, the DLTN server (370) can be implemented using a run-time environment (such as NodeJS) for server-side scripting and command line tools, as well as a Web application framework (such as Express) that provides functionality for building Web applications and APIs. Alternatively, the DLTN server (370) can be implemented in some other way. In some example implementations, the DLTN server (370) is deployed in a Docker container in the cloud computing environment. Alternatively, the DLTN server (370) is deployed using another virtualization technology.

In some respects, the one or more DLTN servers (370) in the architecture (300) act as a centralized authority by mediating access to the blockchain network and other platform functions (e.g., for authentication or encryption/decryption). For example, a DLTN server (370) controls write access to the blockchain and limits read access to the blockchain using a permissioning mechanism. In other respects, however, the DLTN server (370) does not act as a central authority. There can be multiple DLTN servers (370). Moreover, transactions between users of the DLTN do not require approval or mediation by a DLTN server (370), aside from mediation of access to the blockchain network or other platform functions.

A DLTN server (370) is configured to allow a user, through a DLTN client (312, 316), to perform various actions, as described above. In particular, the functionality of a DLTN server (370) in various scenarios is described in section IV.

The DLTN client (312, 316) and DLTN server (370) can be internationalized/localized to different languages.

The architecture (300) also includes storage (372), which is configured to store photos, attachments, and other data accessible to the DLTN server (370). Such data can be used in various operations for the DLTN. The DLTN server (370) is configured to connect to the storage (372) over a connection that is secured using network ACLs and encryption.

The authentication service (380) provides authentication services to the DLTN server (370). The encryption service (382) provides encryption/decryption services to the DLTN server (370). The DLTN server (370) connects to the authentication service (380) and the encryption service (382) over connections that are secured using network ACLs and encryption. In some example implementations, the authentication service (380) and encryption service (382) are implemented using Vault. Alternatively, the authentication service (380) and encryption service (382) can be implemented in some other way. In some example implementations, the authentication service (380) and encryption service (382) are deployed in a Docker container in the cloud computing environment. Alternatively, the authentication service (380) and encryption service (382) are deployed using another virtualization technology.

The authentication service (380) and encryption service (382) are configured to manage and apply access rules (384) (such as ACL data, policy data) and encryption keys (386) in storage, which is accessible to the authentication service (380) and encryption service (382) over a secure connection. The access rules (384) (e.g., ACL data, policy data) and encryption keys (386) are stored in encrypted form in a protected (isolated) subnetwork with no Internet access. In the DLTN, data is typically encrypted at rest and in transit. In general, data in the blockchain is encrypted with encryption keys that are user-specific and context-specific. In transit, data can be encrypted using a mechanism provided by the connection. In some example implementations, key storage is implemented using Consul. Alternatively, key storage can be implemented in some other way.

Figure 4:
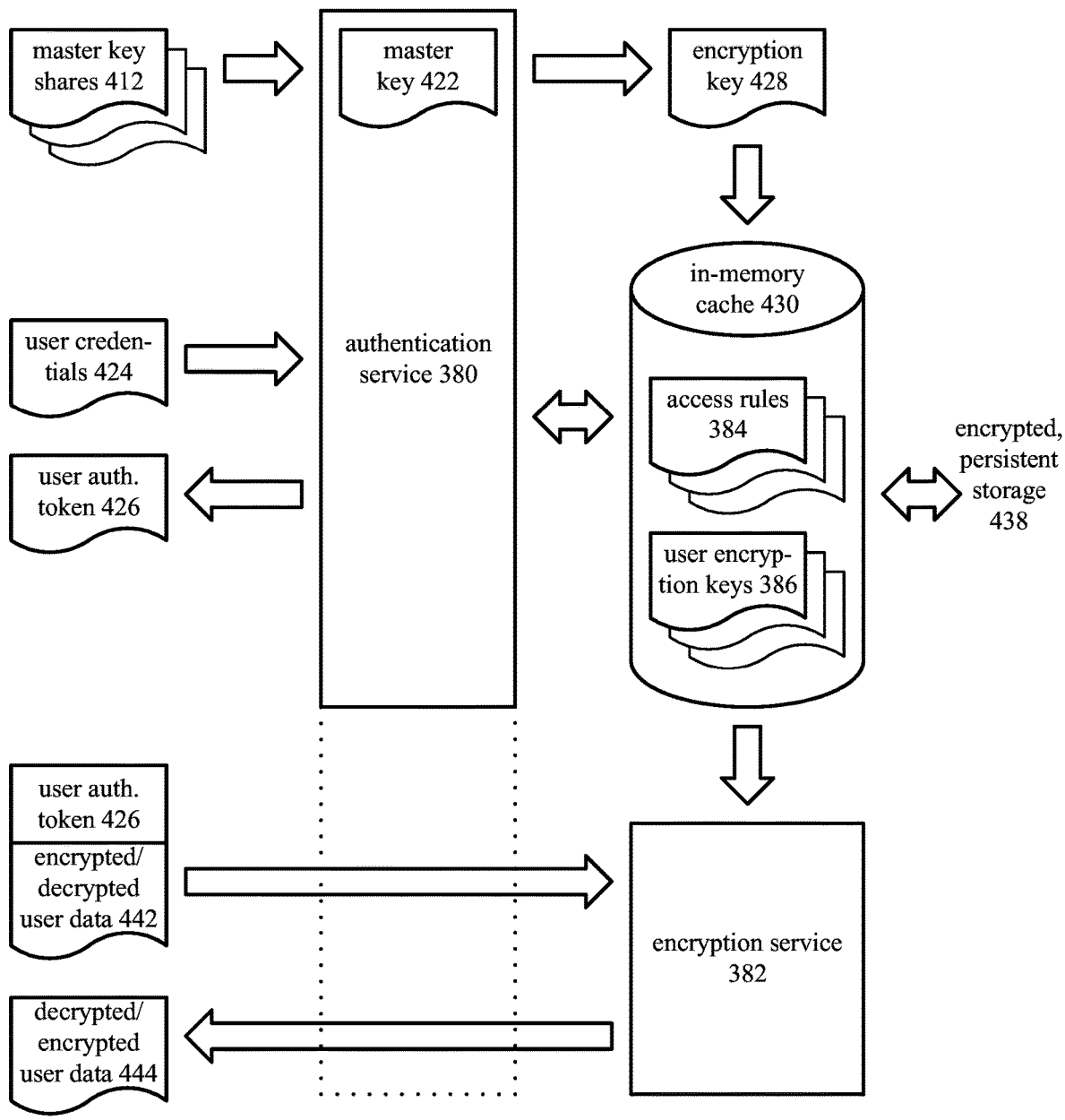
FIG. 4 is a diagram illustrating an example architecture for an authentication service and encryption/decryption service, used in the architecture of FIG. 3.

Operations and features of the authentication service (380) and encryption service (382) are further explained with reference to the architecture (400) of FIG. 4.

The authentication service (380) performs various operations to initialize structures and data used for authentication. For example, the authentication service (380) can use a set of master key shares (412), after a threshold number of master key shares (412) is acquired, to create a master key (422). The authentication service (380) can use the master key (422) to determine an encryption key (428) that is usable to decrypt access rules (384) and user encryption keys (386). The authentication service (380) can retrieve encrypted versions of the access rules (384) and user encryption keys (386) from persistent storage (438) and perform decryption operations using the encryption key (428). The decrypted access rules (384) and user encryption keys (386) are buffered in an in-memory cache (430) accessible to the authentication service (380).

When a user enrolls, the authentication service (380) can randomly generate a set of encryption keys for a user. The authentication service (380) can use key derivation and rotation to separate encryption contexts. If needed, the authentication service (380) can generate additional encryption keys for the user (e.g., for different subsets of users with whom user data is shared, or for other different contexts). The encryption keys for a user can be organized in different ways, depending on implementation. For example, the encryption keys for a user can include a first set of one or more encryption keys used to encrypt/decrypt data that is not shared (i.e., private), a second set of one or more encryption keys used to encrypt/decrypt data that is shared with the connections of the user in the DLTN, and a third set of one or more encryption keys used to encrypt/decrypt data that is shared with everybody in the DLTN (i.e., public). In this configuration, according to access rules (ACLs, policy data, etc.) and consistent with permission settings, the first encryption key(s) are not shared with other users, the second encryption key(s) are shared with connections of the user in the DLTN, and the third encryption key(s) are shared with all users in the DLTN. (An encryption key that is "shared" with another user can be accessed and used by the encryption service (382) on behalf of the other user, but is not actually distributed to the other user.) Or, as another example, the encryption keys for a user can include one or more encryption keys for each different subset of users in the DLTN (e.g., first encryption key(s) shared with no users, second encryption key(s) shared with a first subset of users, third encryption key(s) shared with a second subset of users, . . . , $n^{th}$ encryption key(s) shared with all users). Alternatively, the encryption keys for a user can be organized in some other way.

In general, access to sensitive data is restricted to rely on authentication, authorization and accountability provided using the authentication service (380) and encryption service (382). Before a user receives access to encryption keys, encryption/decryption requests are checked according to security policies and logged. In operation, the authentication service (380) uses ACLs and policies to regulate access by a user to the encryption keys the user owns as well as shared encryption keys. In some example implementations, the authentication service (380) operates in a "whitelist" mode. An action is not allowed unless explicitly granted via policy. The authentication service (380) receives user credentials (424) for a user from the DLTN server (370) and authenticates the user according to the access rules (e.g., ACL data, policy data). If the user is authenticated and access is granted, the authentication service (380) returns a user authentication token (426) for the user. The user authentication token (426) is associated with a list of access policies and corresponding encryption keys that can be used according to the access policies, which are also provided to the encryption service (382).

For encryption/decryption, the DLTN server (370) passes user data (442) and a user authentication token (426) to the encryption service (382). The encryption service (382) returns user data (444). For a decryption operation, the user data (442) passed to the encryption service (382) is encrypted, and the user data (444) returned by the encryption service has been decrypted using the appropriate encryption key. For an encryption operation, the user data (442) passed to the encryption service (382) is decrypted, and the user data (444) returned by the encryption service has been encrypted using the appropriate encryption key. The "user data" that is encrypted/decrypted by the encryption service (382) can be biographical data, contact data, transaction data, or other user data as described in section IV. In some example implementations, the encryption service (382) uses symmetric key encryption—the same encryption key is used for encryption and decryption of data. Alternatively, the encryption service can use asymmetric key encryption (e.g., according to a public/private key protocol).

IV. Example Management of Permission Settings for User Data in a Blockchain.

This section describes various aspects of management of permission settings for user data in a blockchain in a DLTN. In some example implementations, the innovations enable a user to own, access, monetize, and set permissions for his/her user data. The innovations described in this section can be used to enable various features, including, but not limited to:

- the ability of a given user to control which categories of user data are shared;
- the ability of a given user to control which other users can access the user data of the given user, or to allow access to all user of the DLTN;
- the ability of a given user to revoke previously granted access permissions, or otherwise modify permission settings;
- the ability of a given user to set time limits for access to the user data of the given user;
- the ability of a given user to "go dark" (be forgotten) in the DTLN;
- the ability of a given user to request access to the user data of another user;
- the ability of a given user to respond to requests from other users to access the user data of the given user; and
- the ability of a given user to allow or revoke permissions requested via simple SMS message responses.

A. Introduction.

User data of a user is stored in a blockchain. The user can be an individual, small business, large business, bank, non-profit organization, or other entity. The user data can include biographical data for the user (e.g., name, education records, employment records, credit history records, health records, citizenship, dependents), contact data for the user (e.g., physical address, phone number, email address), identification documents for the user (e.g., credentials), connections of the user in the DLTN, data about one or more transactions that involve the user as a party (e.g., business exchanges, remote purchases, funded wallets, term purchases, cash disbursements), data about assets of the user (e.g., property records), and/or other types of data. User data can include a geo-location tag. As a rule, only one user owns the user data of a user, but for transaction data each user who participates in a transaction can own an equal and secured copy of the transaction data for the transaction.

In general, user data in the blockchain can be indexed at the user level, organization level, or asset level. Typically, however, user data is associated with the user ID of the user who wrote the user data to the blockchain (owns the user data). For example, as shown in FIG. 2, a block in a blockchain includes a user ID of a user as well as user data supplied by the user. Association of user data with corresponding user in the blockchain facilitates control, by the user, of permission to access the user data. The user data of the user is encrypted with one or more encryption keys that the user controls, which effectively allows the user to own the user data. The encryption keys can be user-specific (to the owner of the user data) and context-specific (e.g., per group of users, per data category). The user can selectively share the encryption keys with other users, to allow the other users to access the user data. Control of access to the encryption keys through permission settings can, therefore, allow the user to control access to the user data. In some example implementations, a block can also include a key ID that identifies the encryption key used to encrypt the user data in the block and a category ID that identifies the category of the user data in the block.

Permissions for the user data of a user can be category-limited. That is, a user can set different permissions for different categories of user data of the user. The user that owns user data can grant permission to access all of the user data, or just a subset of the user data. Access to different subsets of the user data can be granted to different groups of other users. In some example implementations, the user that owns user data can be presented with a checkbox per data category, which can be selected or de-selected by the user to grant or revoke access to that category of user data. For example, there are checkboxes for email, phone number, address, transactions, education records, employment records, and assets. Alternatively, per category permission settings can be presented to a user in some other way.

In some example implementations, permissions set by a user can be limited in duration. For example, a user can specify an expiration time and date. Or, the user can specify a duration of time for which access to user data is granted. Alternatively, permissions set by a user have indefinite duration—the permissions remain active until changed by the user.

Depending on implementation, permissions for the user data of a given user can be set on a per user basis for other users of the DLTN, set for arbitrary subsets of users of the DLTN, set for a subset of other users in a defined relationship with the given user (e.g., connections of the user), set for all users of the DLTN, or set for the public. In this way, different permissions can be set for different subsets of users of the DLTN. The different ways to manage permissions (by category, by duration, by user/set of users) can be used in combination. For example, in some example implementations, per-category permissions to access user data of a given user can be set for the public, and per-category permissions can be set for connections of the given user.

When user data is shared with the public over the Internet, the DLTN server (370) can create a Web page that presents the shared user data. The user data is decrypted, and materials for the Web page are cached in memory accessible to a Web server. The DLTN server (370) can provide a URL to the Web page to the DLTN client (312, 316) for the user, which can share the URL. When the URL is de-referenced, the shared user data is presented as the Web page in a Web browser. If the user changes the user data that is shared, the Web page can be re-created and assigned the same URL or a different URL. If the user revokes access to the previously shared user data, the Web page and associated materials can be removed from the cache.

A user can configure permission settings when the user joins a DLTN or when the user first adds user data to the blockchain. The user can also configure permission settings at a later time, e.g., driven by some event that causes the user to want to share access to user data or revoke access to user data.

As explained above, permission settings can be set proactively by a given user. Permission settings can also be set reactively by the given user, in response to requests from other users to access the user data of the given user.

In the DLTN, a user can request user data of another user in the DLTN. The requesting user can be a connection of the user who owns the user data. Or, the requesting user can be some other user in the DLTN. The requesting user can request access for all user data of owner or a subset of the user data of the owner. For example, the requesting user can select one or more checkboxes for different categories of user data that are requested.

The user who owns the user data can respond to the request through various channels. For example, if the user is logged in to a DLTN client for the DLTN, the user can access a page that lists the requests to be reviewed. Beside each request, one or more graphical elements can indicate whether the request is approved or rejected. Or, if the user is logged in to a DLTN client for the DLTN, a pop-up box can be presented in the UI of the DLTN client, prompting the user to approve or reject the request.

Alternatively, a request can be reviewed through another channel. The request can be reviewed in a channel different than the channel in which the request was made, for multi-channel permissioning of user data in a blockchain. For example, a request can be presented to a user in an SMS message. The SMS message can prompt the user to approve the request by sending a reply message via SMS or by accessing a Web page with a graphical control that can be actuated to approve the request. Or, as another example, an email can be sent to the user who owns the user data, prompting the user to approve the request (by return email) or log in to the DLTN client to review the request.

A request can be approved or rejected as a whole. Alternatively, in some example implementations, a request can be approved or rejected in part (e.g., on a category-by-category basis). If a request (or part of a request) is approved, a set of smart contract algorithms can package the right set of permissions for access. That is, permissions can be set by applying conditional logic based on the request and approval, and the updated permission settings can be stored.

The permission settings for user data of a user can be stored and deployed in various ways. For example, the permission settings can be stored in a block of the blockchain that is associated with the user. That is, permission settings are persisted in the blockchain in association with the identity of the user. The permission settings can be encrypted with an encryption key of the user that is shared with other users of the DLTN. When another user attempts to access the user data, the permission settings can be retrieved from the blockchain (by a DLTN server on behalf of the other user), decrypted using the shared encryption key, and evaluated in conjunction with access rules, ACL, policy rules, etc. to determine whether access is granted. If access is granted, the appropriate shared encryption key(s) can be identified and conveyed to the encryption service for use in decrypting the requested user data. If access is not granted, the request to access the user data is denied, but a request to grant access can be sent to the owner of the user data for review. If the permission settings change, the updated permission settings can be stored in a new block of the blockchain, superseding the previous block. Thus, the currently active permissions are stored in the last permission settings block for the user in the blockchain. The updated permission settings can be encrypted with the same encryption key or a different encryption key.

Alternatively, permission settings can be incorporated into ACL data, policy data, or access rules that an authentication service applies when managing access to user data in a blockchain. When a user updates permission settings, the authentication service updates the ACL data, policy data, or access rules to reflect the changes. The authentication service generates new encryption keys for the user, as needed. The ACL data, policy data, or access rules are encrypted with a general key of the authentication service, not a user-specific encryption key. When another user attempts to access user data of a given user, the permission settings can be evaluated as part of access rules, ACL, policy rules, etc. to determine whether access is granted. If access is granted, the appropriate shared encryption key(s) can be identified and conveyed to the encryption service for use in decrypting the requested user data. If access is not granted, the request to access the user data is denied, but a request to grant access can be sent to the owner of the user data for review.

B. Examples of Operations Involving Permission Settings for User Data.

FIG. 5a, 5b, 7a-7e, 9a, and 9b illustrate different operations involving permission settings for user data. Some of the operations are performed by a DLTN client, while other operations are performed by a DLTN server. In general, the DLTN client is configured to perform various operations to interoperate with the DLTN server to access a DLTN, and the DLTN server is configured to perform various operations to provide access to the DLTN. In some example implementations, the DLTN uses Ethereum technology. Alternatively, the DLTN uses another DLTN technology.

In these examples, the user data of a user is (or will be) stored in a blockchain of the DLTN in association with identity of the user. In some example implementations, the blockchain is a private blockchain, with the DLTN server managing access to the private blockchain. Alternatively, the blockchain is a public blockchain. The blockchain includes one or more blocks. For example, a given block among the one or more blocks of the blockchain includes a hash value based on one or more previous blocks in the blockchain, a key identifier, a type value, a user ID of the given user, and user data of a given user. The user data is encrypted, e.g., using one of a set of encryption keys that are user-specific and context-specific. Alternatively, a given block of the blockchain includes other and/or additional fields.

In some examples, access is requested to user data of a user. The requested user data can be all of the available user data of the user. Or, the requested user data can be a subset of the available user data of the user, where the subset include one or more categories of the user data of the user. The user data can include biographical data for the user (e.g., name, education records, employment records, credit history records, health records, citizenship, dependents), contact data for the user (e.g., physical address, phone number, email address), identification documents for the user (e.g., credentials), connections of the user in the DLTN, data about one or more transactions that involve the user as a party (e.g., business exchanges, remote purchases, funded wallets, term purchases, cash disbursements), data about assets of the user (e.g., property records), and/or other types of data.

With respect to the set of users affected by permission settings, the permission settings can be organized in various ways. For example, the permission settings can include group permission settings that control private access, by a group of one or more connected users through the DLTN, to the user data of the user. As another example, the permission settings can include individual permission settings that control private access, per connected user through the DLTN, to the user data of the user. As another example, the permission settings can include public permission settings that control public access, over the Internet, to the user data of the user.

With respect to the user data affected by permission settings, the permission settings can be organized in various ways. For example, the permission settings can include category-specific permission settings that control grant of access to respective categories of the user data of the user. As another example, the permission settings can include global permission settings that control grant of access to all of the user data of the user.

Permission settings can be time-limited. For example, the permission settings include one or more timed permission settings that control grant of access to the user data of the user before an expiration time. Alternatively, the permission settings can have indefinite duration, remaining in effect until changed.

In some example implementations, the DLTN client is a DLTN client (312, 316) as described with reference to FIG. 3, and the DLTN server is a DLTN server (370) as described with reference to FIG. 3. The DLTN server can include a Web application and implement an API accessible to the DLTN client. The DLTN client can be implemented as a set of functions of a Web browser to control client-facing scripting logic executed by the DLTN server. The DLTN server executes in a public sub-network of a cloud computing service. The DLTN server is configured to call an authentication service and an encryption service that execute in an isolated sub-network of the cloud computing service. For operations that involve the blockchain of the DLTN, the DLTN server is configured to call one or more nodes of the DLTN that execute in an isolated sub-network of the cloud computing service. Alternatively, the DLTN client and/or DLTN server are implemented in some other way, for example, as described above with reference to FIG. 3.

C. Examples of Setting or Changing Permissions to Access User Data.

FIG. 5a shows a generalized technique (501) for updating permission settings for user data of a given user in a DLTN, from the perspective of a DLTN client of the given user. FIG. 5b shows a generalized technique (502) for updating permission settings for user data of a given user in the DLTN, from the perspective of a DLTN server.

With reference to FIG. 5a, the DLTN client sends (510), to the DLTN server, a request for permission settings for user data of a user. With reference to FIG. 5b, the DLTN server receives (515), from the DLTN client, the request for permission settings for user data of the user. The request can be sent/received in encrypted form over a secure connection.

The DLTN server retrieves (520) the permission settings. The permission settings can be stored in persistent storage and retrieved in various ways, as described below.

The DLTN server sends (525), to the DLTN client, the permission settings. With reference to FIG. 5a, the DLTN client receives (530), from the DLTN server, the permission settings. The permission settings can be sent/received in encrypted form over a secure connection.

The DLTN client presents (535), through the UI of the DLTN client, the permission settings. For example, the DLTN client displays, through the UI of the DLTN client, graphical controls operable to grant of access to respective categories of the user data of the user.

The DLTN client receives (540), through the UI of the DLTN client, user input from the user indicating one or more updates to the permission settings. For example, the update(s) to the permission settings include a grant of access to at least some of the user data of the user. Or, as another example, the update(s) to the permission settings include a revocation of access to at least some of the user data of the user.

The DLTN client sends (545), to the DLTN server, the one or more updates to the permission settings. With reference to FIG. 5b, the DLTN server receives (550), from the DLTN client, one or more updates to the permission settings. The update(s) to the permission settings can be sent/received in encrypted form over a secure connection.

Based on the one or more updates to the permission settings, the DLTN server updates (555) the permission settings. The permission settings can be updated in various ways, depending on how they are stored in persistent storage, as described below.

When categories of the user data of the user are publicly accessible, the DLTN server can perform additional operations to make the user data available. For example, the DLTN server can create a Web page that includes any categories of the user data of the user that are publicly accessible. The DLTN server can then send, to the DLTN client, a link to the Web page.

The DLTN server can perform additional operations based on the update(s) to the permission settings. Because an update can revoke access to user data that was previously accessible, or grant access to user data that was previously inaccessible, the DLTN server can change how user data is encrypted. For example, the DLTN server can decrypt at least some of the user data of the user using a first encryption key among the set of encryption keys for the user. The DLTN server can then re-encrypt the at least some of the user data of the user using a second encryption key (different than the first encryption key) among the set of encryption keys. The DLTN server can store the re-encrypted user data of the user in a new block in the blockchain.

Permission settings can be updated as shown in FIGS. 5a and 5b when a user enrolls. In this case, the request for permission settings can be part of a request to enroll the user, and the update(s) to the permission settings are changes to default, initial values for the permission settings. Or, permission settings can be updated as shown in FIGS. 5a and 5b when the user later changes permission settings. In this case, the request for permission settings can be part of a request to review the permission settings, and the update(s) to the permission settings are changes to previously set values for the permission settings.

The permission settings can be stored in encrypted form in the blockchain of the DLTN in association with the identity of the user. In this case, the DLTN server can retrieve the permission settings by searching the blockchain for the permission settings. Or, the DLTN server can retrieve the permission settings by requesting the permission settings from a service of the DLTN. When the DLTN server updates the permission settings, a new version of the permission settings (or at least the updated permission settings) is stored in a new block in the blockchain.

Alternatively, the permission settings can be stored in encrypted form in storage accessible to an authentication service. In this case, the permission settings can be encrypted and decrypted using a master key of the authentication service. The permission settings are enforceable by the authentication service in conjunction with one or more access rules. When the DLTN server updates the permission settings, the DLTN server can change the permission settings in the storage accessible to the authentication service.

FIG. 6 shows an example approach (600) to updating permission settings for user data of a given user in a DLTN. The approach includes some of the operations described with reference to FIGS. 5a and 5b as well as operations for user login, decryption, and encryption. In the example approach (600) shown in FIG. 6, communication between the DLTN client and DLTN server can use encrypted messages over a secure connection for a session (e.g., SSL connection). Permission settings and user data can be stored in encrypted form using separate encryption keys, which are specific to the given user (owner of the user data) and managed by an encryption service.

To start, in a login stage (610), a user, who is the owner of the user data, initiates (611) a login process through the UI of a DLTN client. The DLTN client provides (612) credentials of the user to the DLTN server. The DLTN server authenticates (613, 614) the user with an authentication service, which provides a user authentication token to the DLTN server when authentication succeeds. The DLTN server sends (615) a message to the DLTN client, indicating that authentication has succeeded.

In the next stage (620), permission settings for the user data of the user are requested and presented. Through the UI of the DLTN client, the user requests (621) the permission settings. The DLTN client sends (622) the request to the DLTN server, which retrieves (623, 624) the permission settings from the blockchain or other storage. The permission settings can be retrieved in encrypted form, in which case the DLTN server calls (625) an encryption service to decrypt the permission settings. To decrypt the permission settings, the encryption service uses one or more appropriate user-specific encryption keys for the user (owner of the user data). The encryption service returns (626) the permission settings in decrypted form to the DLTN server, which sends (627) the decrypted permission settings to the DLTN client (over the secure connection for the session). The DLTN client presents (628) the permission settings through the UI of the DLTN client.

In the next stage (630), the permission settings are selectively updated. The user provides (631), through the UI of the DLTN client, user input that indicates one or more updates to the permission settings. The DLTN client sends (632) the update(s) to the DLTN server, which updates the permission settings. If the updated permission settings are stored in encrypted form, the DLTN server calls (633) the encryption service to encrypt the updated permission settings, and the encryption service returns (634) the updated permission settings in encrypted form. To encrypt the permission settings, the encryption service uses one or more appropriate user-specific encryption keys for the user (owner of the user data). The DLTN server stores (635) the updated permission settings in the blockchain or other storage.

D. Examples of Requesting and Approving Permissions to Access User Data.

Figure 7A:
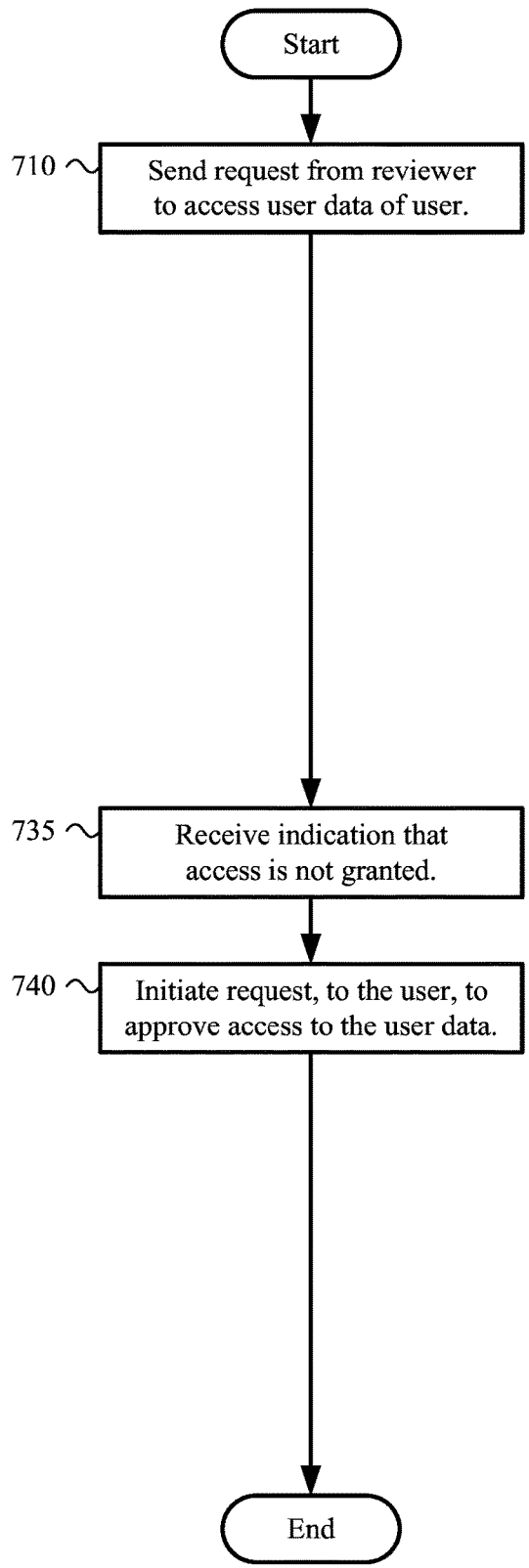
Figure 7B:
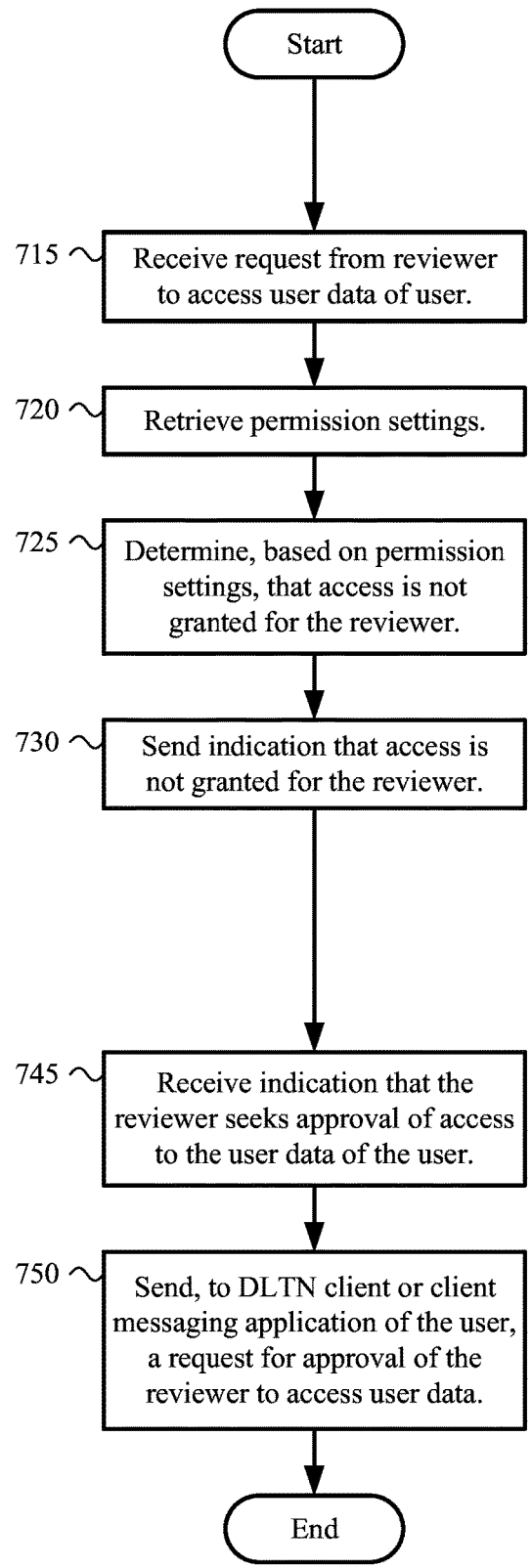

FIG. 7a shows a generalized technique (701) for requesting access to user data of a given user in a DLTN, from the perspective of a DLTN client of another user, who is a potential reviewer of the user data. FIG. 7b shows a corresponding generalized technique (702) from the perspective of a DLTN server.

With reference to FIG. 7a, the DLTN client sends (710), to the DLTN server, a request from a reviewer to access user data of a user. With reference to FIG. 7b, the DLTN server receives (715), from the DLTN client, a request to access user data of a user. The request can be sent/received in encrypted form over a secure connection.

The DLTN server retrieves (720) permission settings for the user. The permission settings can be stored in persistent storage and retrieved in various ways. For example, the permission settings can be stored in encrypted form in the blockchain of the DLTN in association with the identity of the user. In this case, the DLTN server can retrieve the permission settings by searching the blockchain for the permission settings. Or, the DLTN server can retrieve the permission settings by requesting the permission settings from a service of the DLTN. Alternatively, the permission settings can be stored in encrypted form in storage accessible to an authentication service. In this case, the permission settings can be encrypted and decrypted using a master key of the authentication service. The permission settings are enforceable by the authentication service in conjunction with one or more access rules.

The DLTN server determines (725), based on the permission settings, that access is not granted for the reviewer to the user data of the user. The DLTN server sends (730), to the DLTN client, an indication that access is not granted for the reviewer to the user data of the user. The indication can be sent in encrypted form over a secure connection.

With reference to FIG. 7a, the DLTN client receives (735), from the DLTN server, the indication that, according to permission settings for the user data of the user, access is not granted to the user data of the user. In response, the DLTN client can display, through a UI of the DLTN client, one or more graphical elements that indicate access is not granted to the user data of the user. Subsequently, the DLTN client can receive, through the UI of the DLTN client, user input from the reviewer indicating a request to approve access to the user data of the user. The DLTN client initiates (740) a request, to the user, to approve access to the user data of the user. For example, the DLTN client sends, to the DLTN server or a server messaging application, an indication that the reviewer seeks approval by the user of access to the user data of the user.

With reference to FIG. 7b, the DLTN server receives (745), from the DLTN client, an indication that the reviewer seeks approval by the user of access to the user data of the user. The DLTN server then sends (750), to a DLTN client of the user or a client messaging application of the user, a request for approval by the user of the reviewer to access user data of the user. At least when sent to the DLTN client of the user, the request can be sent in encrypted form over a secure connection.

Figure 7C:
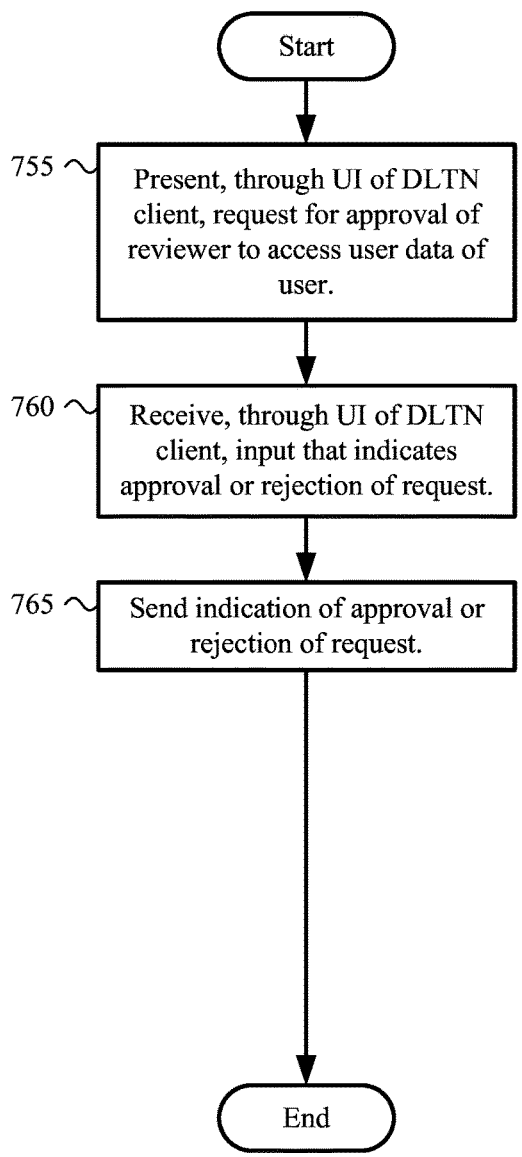
Figure 7D:
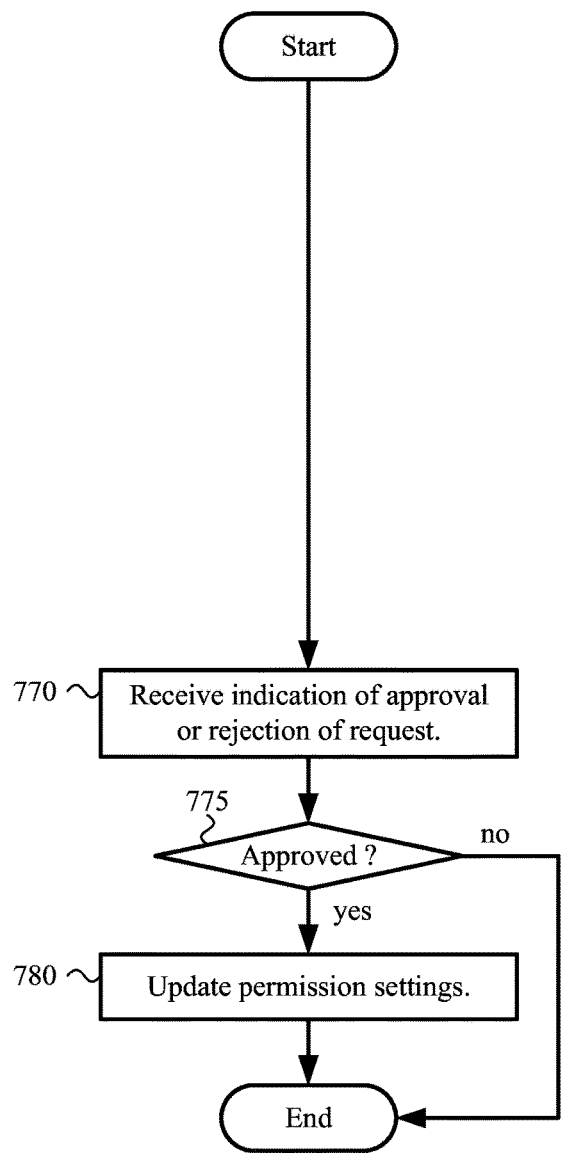

FIG. 7c shows a generalized technique (703) for approving access to user data of a given user, from the perspective of a DLTN client of the given user. FIG. 7d shows a corresponding generalized technique (704) from the perspective of a DLTN server.

With reference to FIG. 7c, the DLTN client presents (755), through the UI of the DLTN client, a request for approval by a user of a reviewer to access user data of the user. For example, the DLTN client displays, through the UI of the DLTN client, graphical controls that are operable to indicate the approval or rejection of the request. The request can be received by the DLTN client from the DLTN server in encrypted form over a secure connection.

The DLTN client receives (760), through the UI of the DLTN client, input that indicates approval or rejection of the request.

The DLTN client sends (765), to the DLTN server, an indication of approval or rejection of the request. With reference to FIG. 7d, the DLTN server receives (770), from the DLTN client, the indication of approval or rejection of the request. The indication of approval or rejection can be sent/received in encrypted form over a secure connection.

Based on the indication, the DLTN server selectively updates the permission settings. Specifically, the DLTN server checks (775) if the request from the reviewer has been approved. If so, the DLTN server updates (780) the permission settings to provide the reviewer with the requested access to the user data of the user. The permission settings can be updated in various ways, depending on how they are stored in persistent storage. For example, if the permission settings are stored in encrypted form in the blockchain of the DLTN in association with the identity of the user, when the DLTN server updates the permission settings, a new version of the permission settings (or at least the updated permission settings) is stored in a new block in the blockchain. Alternatively, if the permission settings are stored in encrypted form in storage accessible to an authentication service, when the DLTN server updates the permission settings, the DLTN server can change the permission settings in the storage accessible to the authentication service.

The DLTN server can perform additional operations based on the indication of approval or rejection of the request. Because approval grants access to user data that was previously inaccessible, the DLTN server can change how user data is encrypted. For example, the DLTN server can decrypt at least some of the user data of the user using a first encryption key among the set of encryption keys for the user. The DLTN server can then re-encrypt the at least some of the user data of the user using a second encryption key (different than the first encryption key) among the set of encryption keys. The DLTN server can store the re-encrypted user data of the user in a new block in the blockchain.

While FIG. 7c shows operations performed with a DLTN client that interoperates with a DLTN server, FIG. 7e shows a generalized technique (705) for approving access to user data of a given user using an alternative channel. Operations for the technique (705) can be performed by a client messaging application such as an SMS messaging application. The technique (705) can be performed, for example, if the given user is not logged in to the DLTN or does not have access to a DLTN client.

To start, the client messaging application presents (756), through the UI of the client messaging application, a request for approval of a reviewer to access user data of a user. For example, the client messaging application displays, through the UI of the client messaging application, a text message that includes text describing the request. The text message can also include a link to a Web page and/or a messaging number.

The client messaging application receives (761), through the UI of the client messaging application, user input from the user that indicates approval of the request. The client messaging application sends (766), to a Web server or to a server messaging application, an indication of the approval of the request. For example, if the request (e.g., text message) includes a link to a Web page, the client system can launch a Web browser and navigate to the Web page indicated in the link, thereby notifying a Web server of the approval of the request. Or, as another example, if the request (e.g., text message) includes a messaging number, the client messaging application can send a text message to the messaging number, thereby notifying a server messaging application of the approval of the request.

FIGS. 8a and 8b show an example approach (800) to requesting and approving access to user data of a given user in a DLTN. The approach includes some of the operations described with reference to FIGS. 7a-7d as well as operations for user login, decryption, and encryption. In the example approach (800) shown in FIGS. 8a and 8b, communication between the DLTN client and DLTN server can use encrypted messages over a secure connection for a session (e.g., SSL connection). Permission settings and user data can be stored in encrypted form using separate encryption keys, which are specific to the given user (owner of the user data) and managed by an encryption service.

With reference to FIG. 8a, in a login stage (810) for a reviewer, the reviewer initiates (811) a login process through the UI of a DLTN client. The DLTN client provides (812) credentials of the reviewer to the DLTN server. The DLTN server authenticates (813, 814) the reviewer with an authentication service, which provides a user authentication token to the DLTN server when authentication succeeds. The DLTN server sends (815) a message to the DLTN client, indicating that authentication has succeeded.

In the next stage (820), the reviewer requests access to user data for another user. Through the UI of the DLTN client, the user requests (821) access to the user data of the user. The DLTN client sends (822) the request to the DLTN server, which retrieves (823, 824) the permission settings for the user (who owns the user data) from the blockchain or other storage. The permission settings can be retrieved in encrypted form, in which case the DLTN server calls (825) an encryption service to decrypt the permission settings. To decrypt the permission settings, the encryption service uses one or more appropriate user-specific encryption keys for the user (owner of the user data). The encryption service returns (826) the permission settings in decrypted form to the DLTN server, which uses the permission settings to determine whether the reviewer has access to the user data of the user. (Alternatively, if the permission settings are directly stored in storage accessible to the authentication service, the authentication service can determine whether the reviewer has access to the user data of the user.) In the example shown in FIGS. 8a and 8b, the DLTN server determines that the reviewer does not have access to the user data of the user. The DLTN server sends (827) to the DLTN client an indication that access is not granted, and the DLTN client presents (828) on the UI of the DLTN client the indication that access is not granted.

In the next stage (830), the reviewer provides (831) input, through the UI of the DLTN client, indicating the reviewer seeks approval by the user of the reviewer to access the user data. The DLTN sends (832), to the DLTN server, an indication that the reviewer seeks approval by the user of the reviewer to access the user data.

With reference to FIG. 8*b*, in a login stage (840) for the user who owns the user data, the user initiates (841) a login process through the UI of a DLTN client. The DLTN client provides (842) credentials of the user to the DLTN server. The DLTN server authenticates (843, 844) the user with an authentication service, which provides a user authentication token to the DLTN server when authentication succeeds. The DLTN server sends (845) a message to the DLTN client, indicating that authentication has succeeded.

In the next stage (850), the DLTN server sends (851), to the DLTN client, a request for approval by the user of the reviewer to access the user data of the user. The DLTN client presents (852) the request in the UI of the DLTN client. Through the UI of the DLTN client, the user provides (853) user input that indicates whether the request is approved. The DLTN client sends (854) an indication of whether the request has been approved or rejected to the DLTN server.

In the next stage (860), based on the indication of whether the request has been approved or rejected, the permission settings are selectively updated. If the DLTN server no longer has the permission settings for the user, the DLTN server retrieves (861, 862) the permission settings for the user (who owns the user data) from the blockchain or other storage. The permission settings can be retrieved in encrypted form, in which case the DLTN server calls (863) an encryption service to decrypt the permission settings. To decrypt the permission settings, the encryption service uses one or more appropriate user-specific encryption keys for the user (owner of the user data). The encryption service returns (864) the permission settings in decrypted form to the DLTN server. The DLTN server updates the permission settings. If the permission settings are stored in encrypted form, the DLTN server calls (865) the encryption service to encrypt the updated permission settings, and the encryption service returns (866) the updated permission settings in encrypted form. To encrypt the permission settings, the encryption service uses one or more appropriate user-specific encryption keys for the user (owner of the user data). The DLTN server stores (867) the updated permission settings in the blockchain or other storage. An indication of approval can be sent to the DLTN client of the reviewer and presented to the reviewer. Subsequently, when the reviewer again attempts to access user data of the user (as in operations 821-826 of FIG. 8*a*, access is granted.

E. Examples of Revoking Permissions to Access User Data.

Figure 9A:
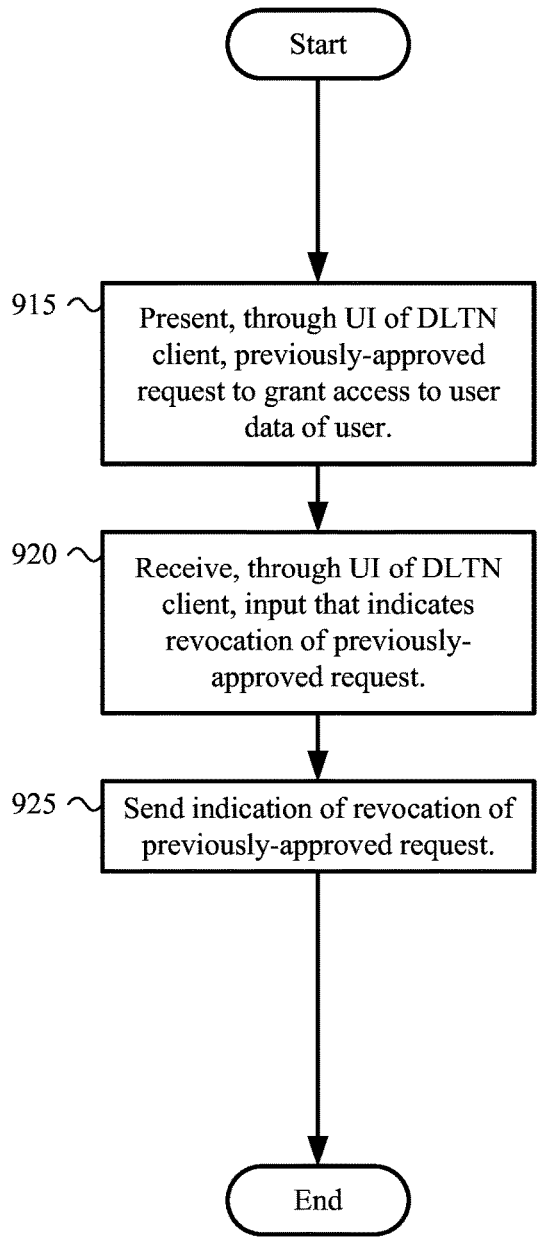
FIGS. 9a and 9b are flowcharts illustrating aspects of a generalized technique for revoking access to user data of a given user in a DLTN.
Figure 9B:
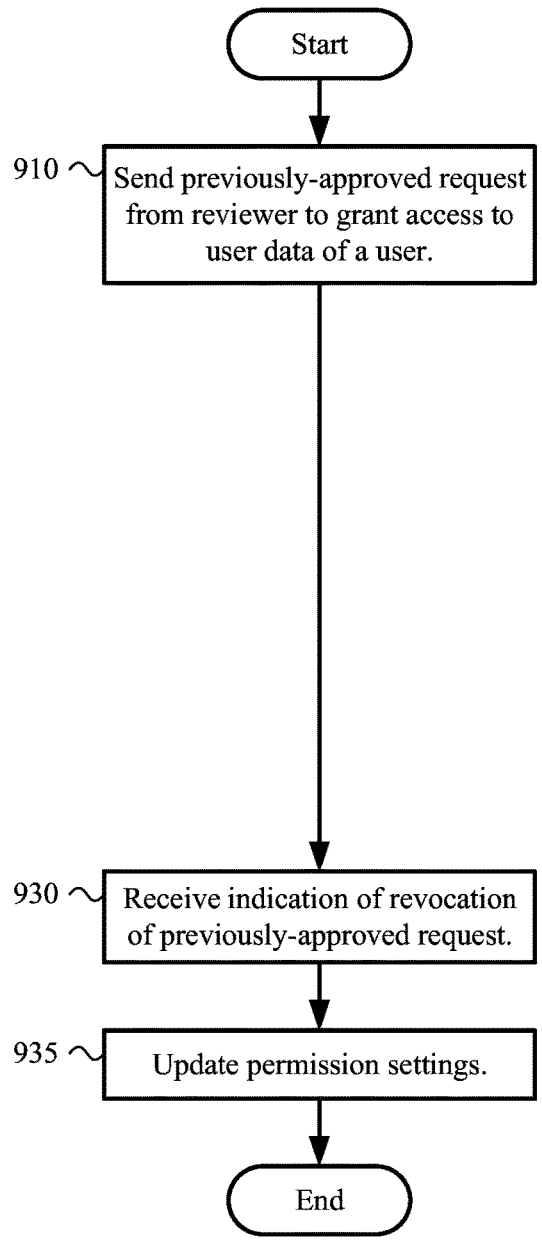

FIG. 9*a* shows a generalized technique (901) for revoking access to user data of a given user in a DLTN, from the perspective of a DLTN client of the given user. FIG. 9*b* shows a corresponding generalized technique (902) from the perspective of a DLTN server.

With reference to FIG. 9*b*, the DLTN server sends (910), to the DLTN client, a previously-approved request from a reviewer to grant access to user data of a user. The previously-approved request can be sent/received in encrypted form over a secure connection.

With reference to FIG. 9*a*, the DLTN client presents (915), through the UI of the DLTN client, a previously-approved request to grant access to user data of a user. For example, the DLTN client displays, through the UI of the DLTN client, graphical controls that are operable to indicate the revocation of the previously-approved request.

The DLTN client receives (920), through the UI of the DLTN client, input that indicates revocation of the previously-approved request.

The DLTN client sends (925), to the DLTN server, an indication of revocation of the previously-approved request. With reference to FIG. 9*b*, the DLTN server receives (930), from the DLTN client, the indication of revocation of the previously-approved request. The indication of revocation can be sent/received in encrypted form over a secure connection.

Based on the indication of revocation of the previously-approved request, the DLTN server updates (935) the permission settings. The permission settings can be updated in various ways, depending on how they are stored in persistent storage. For example, if the permission settings are stored in encrypted form in the blockchain of the DLTN in association with the identity of the user, when the DLTN server updates the permission settings, a new version of the permission settings (or at least the updated permission settings) is stored in a new block in the blockchain. Alternatively, if the permission settings are stored in encrypted form in storage accessible to an authentication service, when the DLTN server updates the permission settings, the DLTN server can change the permission settings in the storage accessible to the authentication service.

Based on the indication of revocation of the previously-approved request, the DLTN server can perform additional operations. Because rejection removes access to user data that was previously accessible, the DLTN server can change how user data is encrypted. For example, the DLTN server can decrypt at least some of the user data of the user using a first encryption key among the set of encryption keys for the user. The DLTN server can then re-encrypt the at least some of the user data of the user using a second encryption key (different than the first encryption key) among the set of encryption keys. The DLTN server can store the re-encrypted user data of the user in a new block in the blockchain.

Figure 10:
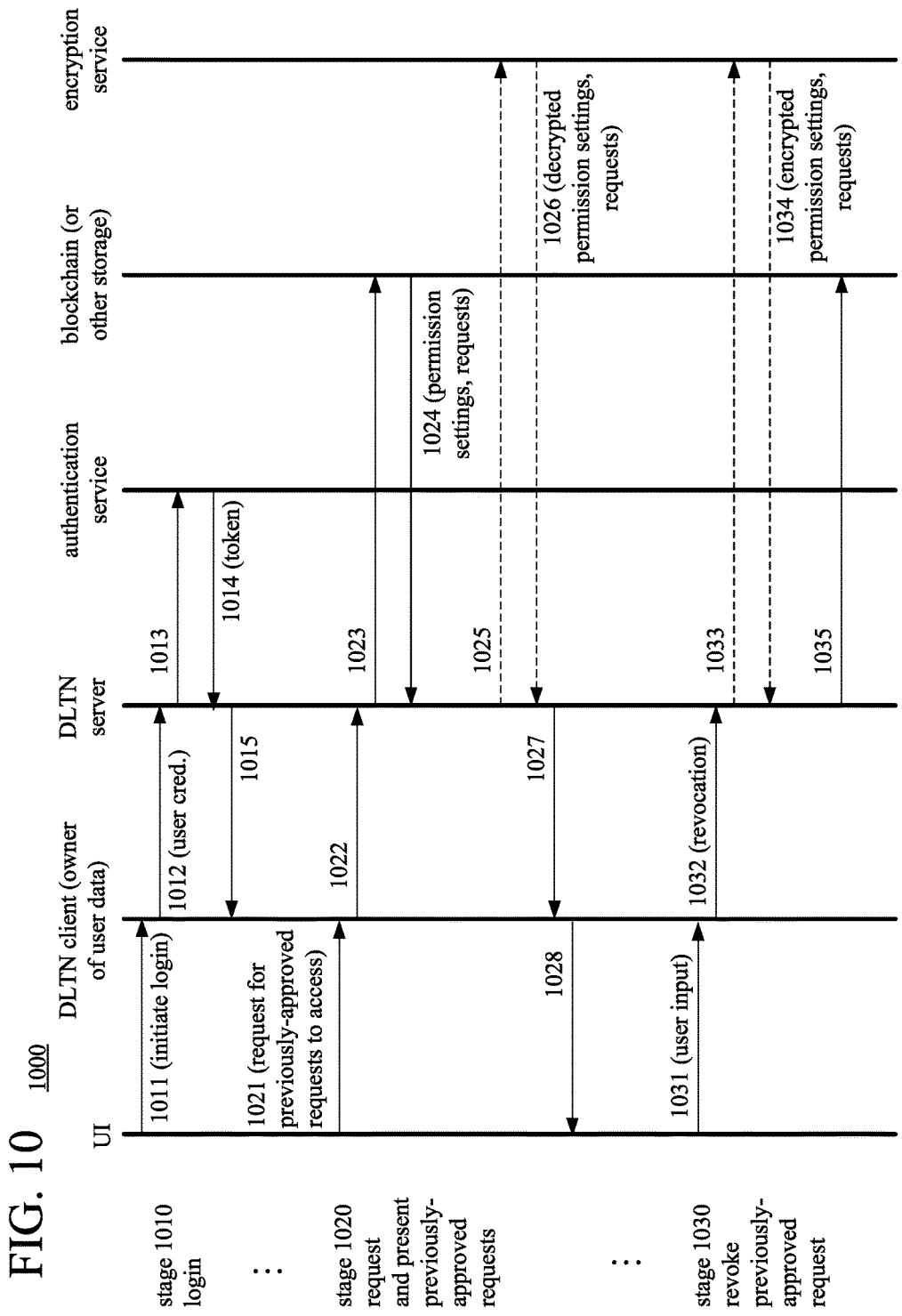
FIG. 10 is a protocol diagram illustrating an example approach to revoking access to user data of a given user in a DLTN.

FIG. 10 shows an example approach (1000) to revoking access to user data of a given user in a DLTN. The approach includes some of the operations described with reference to FIGS. 9*a* and 9*b* as well as operations for user login, decryption, and encryption. In the example approach (1000) shown in FIG. 10, communication between the DLTN client and DLTN server can use encrypted messages over a secure connection for a session (e.g., SSL connection). Permission settings and information about previous requests can be stored in encrypted form using separate encryption keys, which are specific to the given user (owner of the user data) and managed by an encryption service.

To start, in a login stage (1010), a user initiates (1011) a login process through the UI of a DLTN client. The DLTN client provides (1012) credentials of the user to the DLTN server. The DLTN server authenticates (1013, 1014) the user with an authentication service, which provides a user authentication token to the DLTN server when authentication succeeds. The DLTN server sends (1015) a message to the DLTN client, indicating that authentication has succeeded.

In the next stage (1020), a previously-approved request to access user data is requested and presented. Through the UI of the DLTN client, the user requests (1021) a list of previously-approved requests for the user data of the user. The DLTN client sends (1022) the request to the DLTN server, which retrieves (1023, 1024) the permission settings and previously-approved requests from the blockchain or other storage. The permission settings and previously-approved requests can be retrieved in encrypted form, in which case the DLTN server calls (1025) an encryption service to decrypt the permission settings and previously-approved requests. To decrypt the permission settings and previously-approved requests, the encryption service uses one or more appropriate user-specific encryption keys for the user (owner of the user data). The encryption service returns (1026) the permission settings and previously-approved requests in decrypted form to the DLTN server, which sends (1027) the decrypted previously-approved requests to the DLTN client. The DLTN client presents (1028) the previously-approved requests through the UI of the DLTN client.

In the next stage (1030), the user provides (1031), through the UI of the DLTN client, user input that indicates revocation of one of the previously-approved requests. The DLTN client sends (1032) an indication of the revocation to the DLTN server, which updates the permission settings and the list of previously-approved requests (to remove the revoked request). (Alternatively, the DLTN server can retrieve and decrypt the permission settings at this point, instead of retrieving them earlier.) If the updated permission settings and remaining previously-approved requests are stored in encrypted form, the DLTN server calls (1033) the encryption service to encrypt the updated permission settings and remaining previously-approved requests, and the encryption service returns (1034) the updated permission settings and remaining previously-approved requests in encrypted form. To encrypt the permission settings and remaining previously-approved requests, the encryption service uses one or more appropriate user-specific encryption keys for the user (owner of the user data). The DLTN server stores (1035) the updated permission settings and remaining previously-approved requests in the blockchain or other storage. An indication of the revocation can be sent to the DLTN client of the user and/or the DLTN client of the user whose permission was revoked.

F. Example Screenshots.

FIGS. 11a-11j are diagrams of example screenshots illustrating different features of managing permission settings for user data of a given user in a DLTN, in some example implementations. In FIGS. 11a-11c and 11e-11i, the screenshots show pages rendered in a Web browser (for a DLTN client), with graphical elements provided by a Web application (for a DLTN server).

Figure 11A:
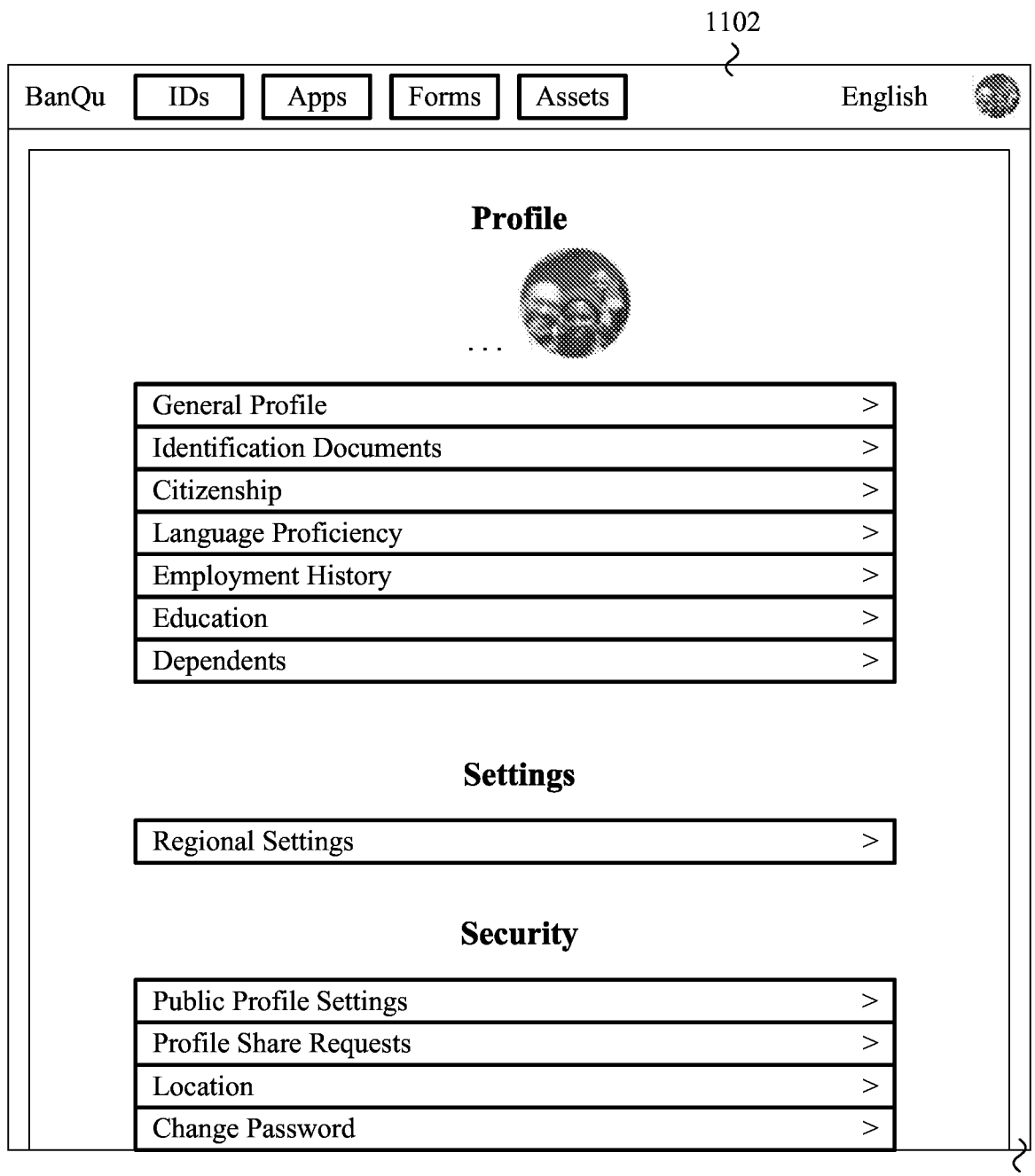

The screenshot (1100) in FIG. 11a shows a front page (1101) of a UI of a DLTN client after a user (Farmer Two) has logged in. The top row (1102) of the front page (1101) includes graphical controls (drop-down menus) that can be actuated to reach menus or pages that show identities associated with the user, available applications, forms (defined by the user, or to be completed or reviewed by the user, or previously submitted by the user), or assets of the user. The top row (1102) also includes graphical indicators that indicate the language of the front page and user who has logged in. Below the top row (1102), the front page (1101) includes sections for the profile of the user, settings, and security. The profile section includes graphical controls that can be actuated to review and edit user data of the user (such as general information, employment history, education), or upload documents (such as identification documents) for the user data of the user. The security section includes graphical controls that can be actuated to review and edit permission settings for the user data of the user ("Public Profile Settings") or review requests to share user data of the user ("Profile Share Requests").

Figure 11B:

The screenshot (1110) in FIG. 11b shows a page (1111) of a UI of a DLTN client after a user (Farmer Two) has actuated a graphical control to review and edit permission settings. The top row (1102) is the same as shown in FIG. 11a. The right column (1113) provides graphical controls and information relevant for permission settings and sharing of user data. At the top of the right column (1113), a link to a Web page that includes publicly available items of the user data of the user is provided ("Link to your shared profile") along with graphical controls that can be used to share the link. Below that, the right column (1113) includes checkboxes that can be selected to share categories of user data of the user with the public or with only connections of the user in the DLTN. In one tab ("Internet"), checkboxes can be selected to share categories of user data of the user with the public. In another tab ("Connections"), checkboxes can be selected to share categories of user data of the user with only the connections of the user in the DLTN. In FIG. 11b, the page (1111) shows four categories (Emails, Language Proficiency, Employment History, and Transactions) selected for sharing with the public, and the page (1111) shows the user data in those categories. Some user data (e.g., Language Proficiency, Employment History) can be edited by actuating a graphical control in the section for that category of user data. Other information (e.g., Transactions) cannot be edited. The user can select or deselect checkboxes to change which categories of user data are shared publicly and which categories of user data are shared with connections of the user. After making changes, the user can save the changes to permission settings by actuating the save button, which results in the updates to the permission settings being sent to the DLTN server.

Figure 11C:
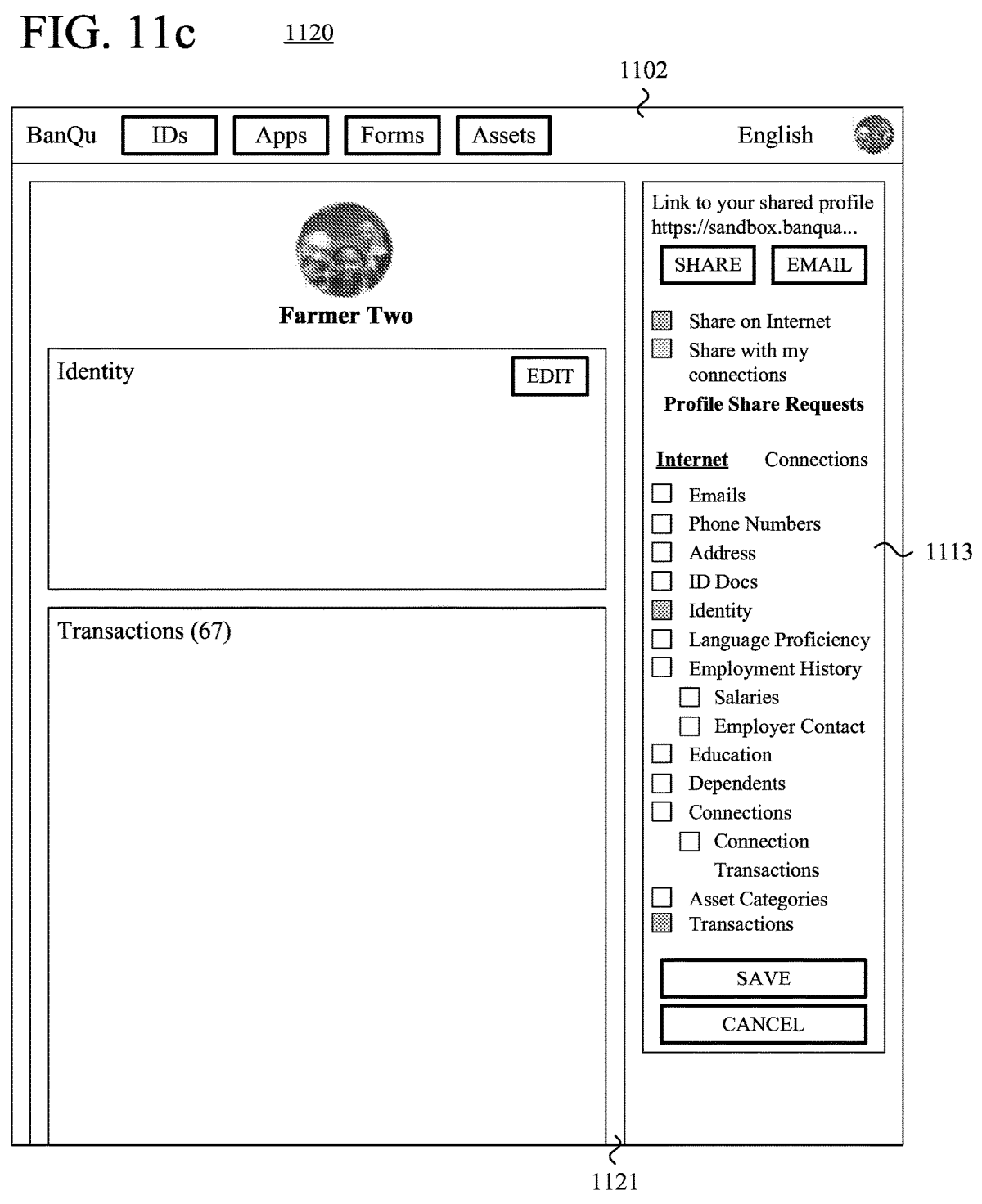

The screenshot (1120) in FIG. 11c shows another page (1121) of a UI of a DLTN client after a user (Farmer Two) has actuated a graphical control to review and edit permission settings. Compared to the page (1111) shown in FIG. 11b, different categories of user data are selected for sharing. In FIG. 11c, the page (1121) shows two categories (Identity and Transactions) selected for sharing with the public as well as the user data in those categories. Some user data (e.g., Identity) can be edited by actuating a graphical control in the section for that category of user data. Other information (e.g., Transactions) cannot be edited.

Figure 11D:
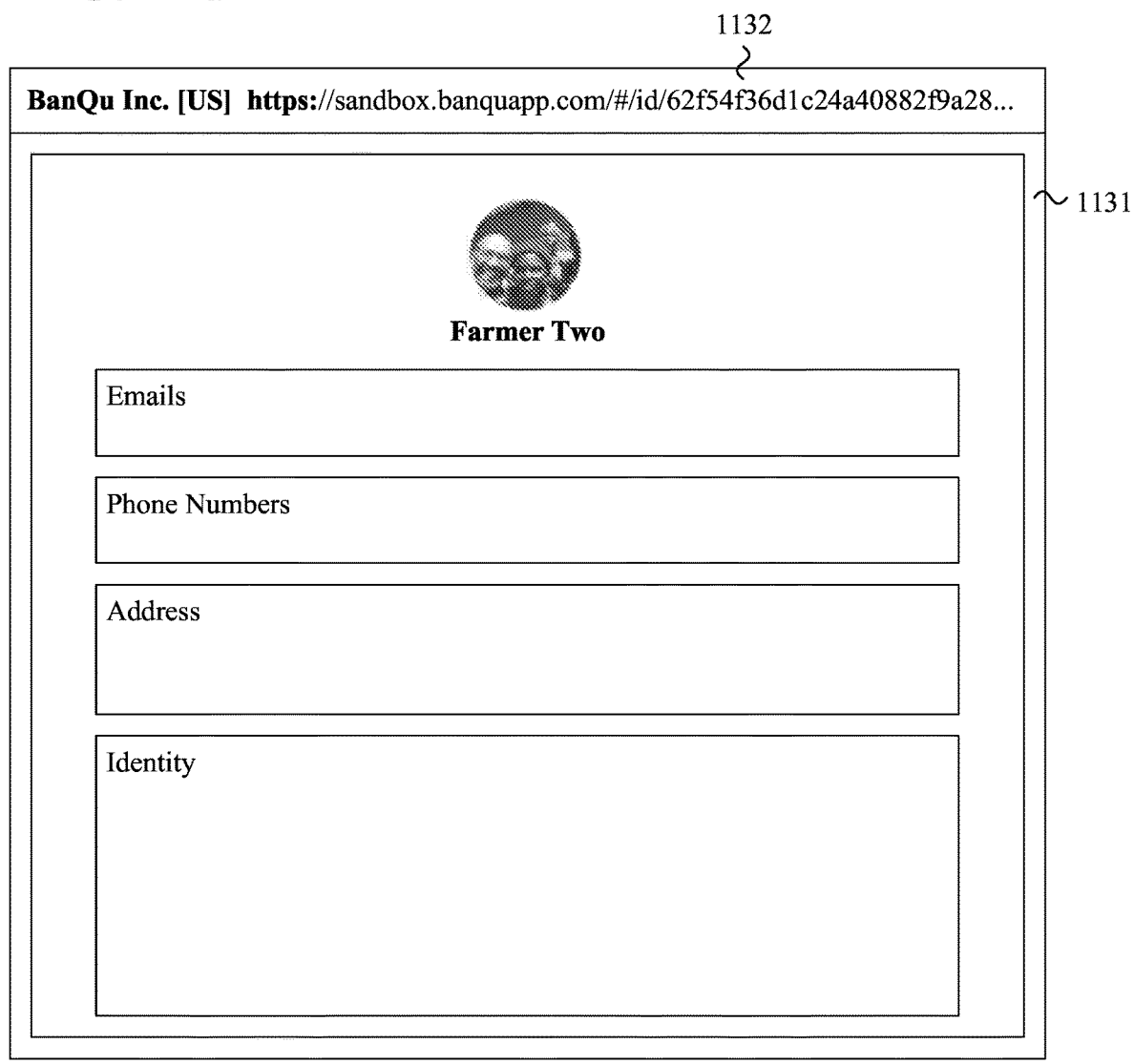

The screenshot (1130) in FIG. 11d shows a Web page (1131) that includes publicly available user data of a user (Farmer Two). The Web page is rendered in a conventional Web browser (not acting as a DLTN client), which includes, e.g., an address bar (1132). In FIG. 11d, the publicly shared user data includes email addresses, phone numbers, physical address, and identity.

Figure 11E:
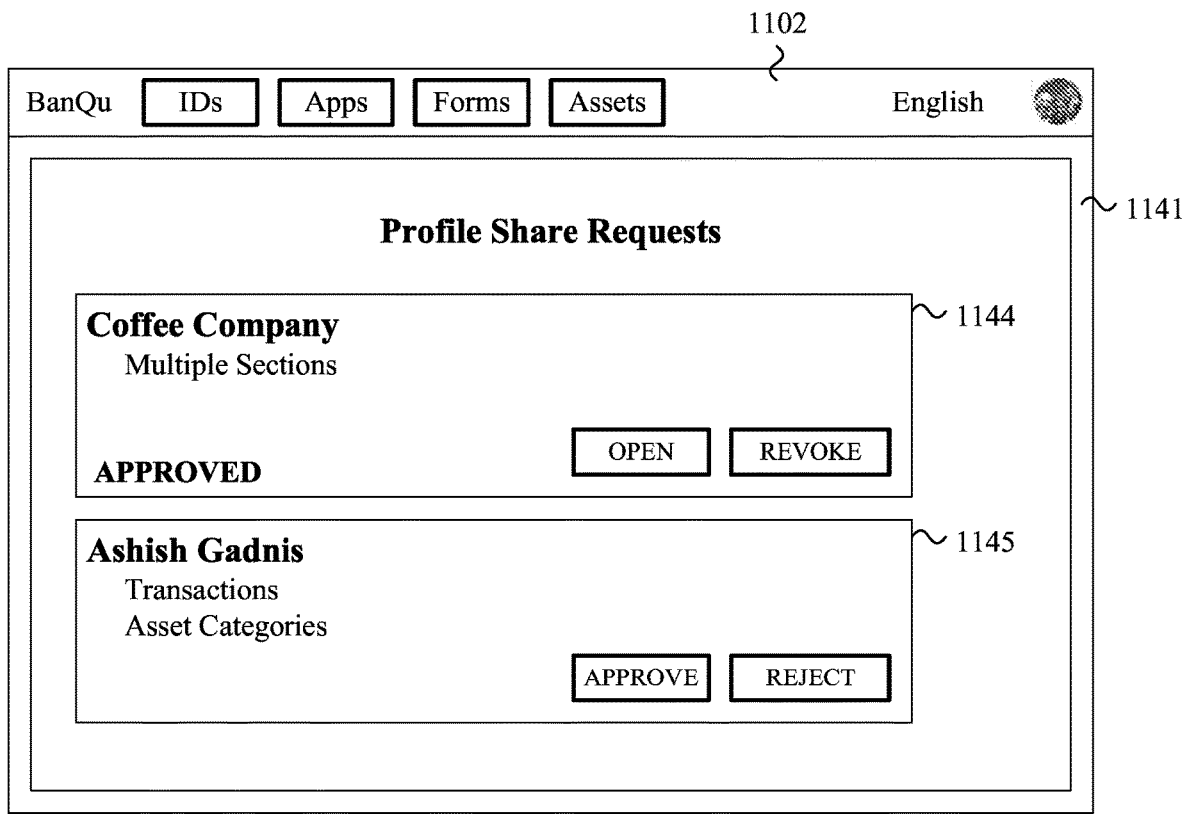

The screenshot (1140) in FIG. 11e shows a page (1141) of a UI of a DLTN client after a user (Farmer Two) has actuated a graphical control to review profile share requests (e.g., the Profile Share Requests control in the front page (1101) of FIG. 11a, or the Profile Share Requests link in the right column (1113) of FIG. 11b or 11c). The top row (1102) is the same as shown in FIGS. 11a-11c. Below the top row (1102), the page (1141) includes sections for two different profile share requests available for the user to review. One request is from the user Coffee Company, and the other request is from the user Ashish Gadnis. Each request lists the requested categories of user data to share for the request or lists a summary ("Multiple Sections"). The first request (from the user Coffee Company) was previously approved, as indicated in the lower left corner. In the section for the first request, graphical controls can be actuated to open the first request or revoke the first request. The second request (from the user Ashish Gadnis) has not yet been approved. In the section for the second request, graphical controls can be actuated to approve or reject the second request.

Figure 11F:
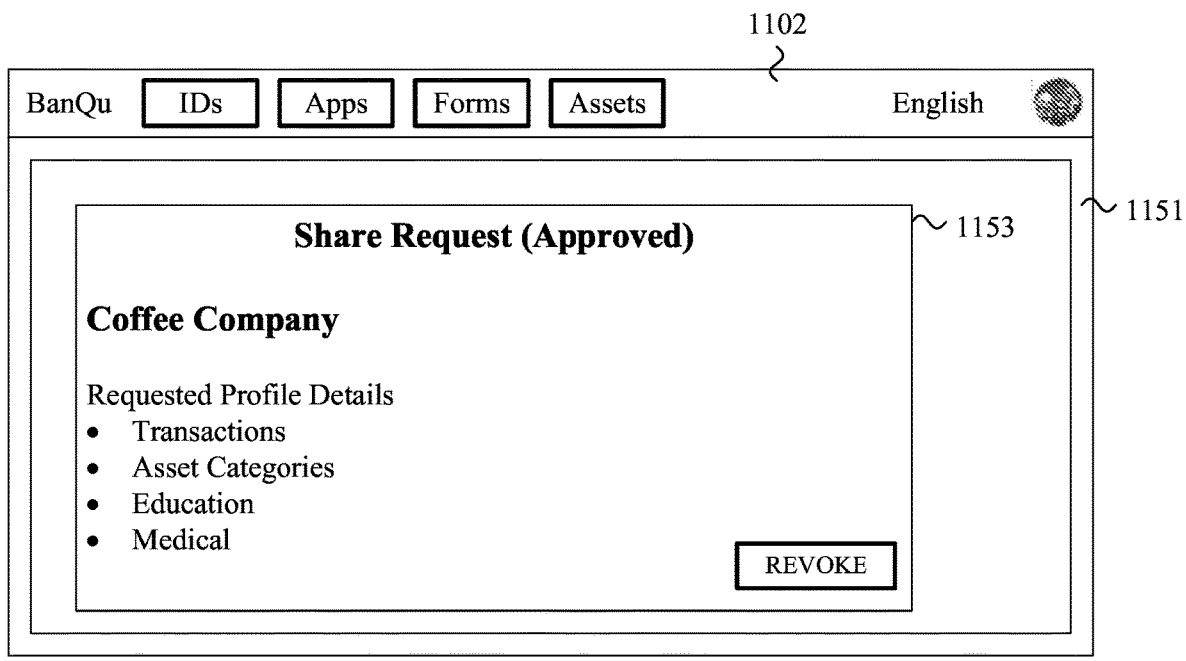

The screenshot (1150) in FIG. 11f shows a page (1151) of a UI of a DLTN client after a user (Farmer Two) has actuated a graphical control to review the first request (from the user Coffee Company). The top row (1102) is the same as shown in FIGS. 11a-11c and 11e. Below the top row (1102), the page (1151) includes a section for the first profile share request (from the user Coffee Company). The section lists the requested categories of user data to share for the first request. A graphical control can be actuated to revoke the first request.

Figure 11G:
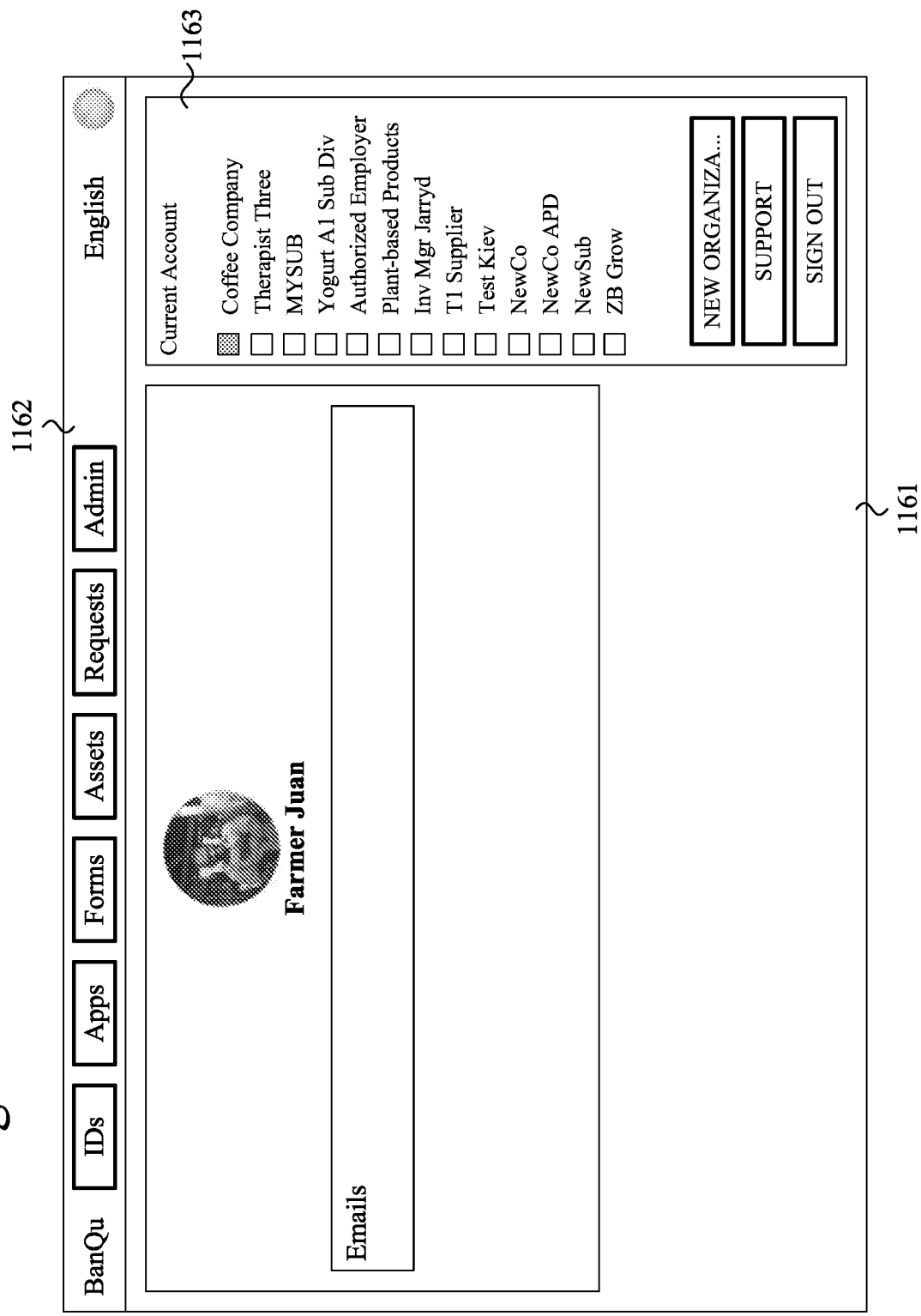
Figure 11H:
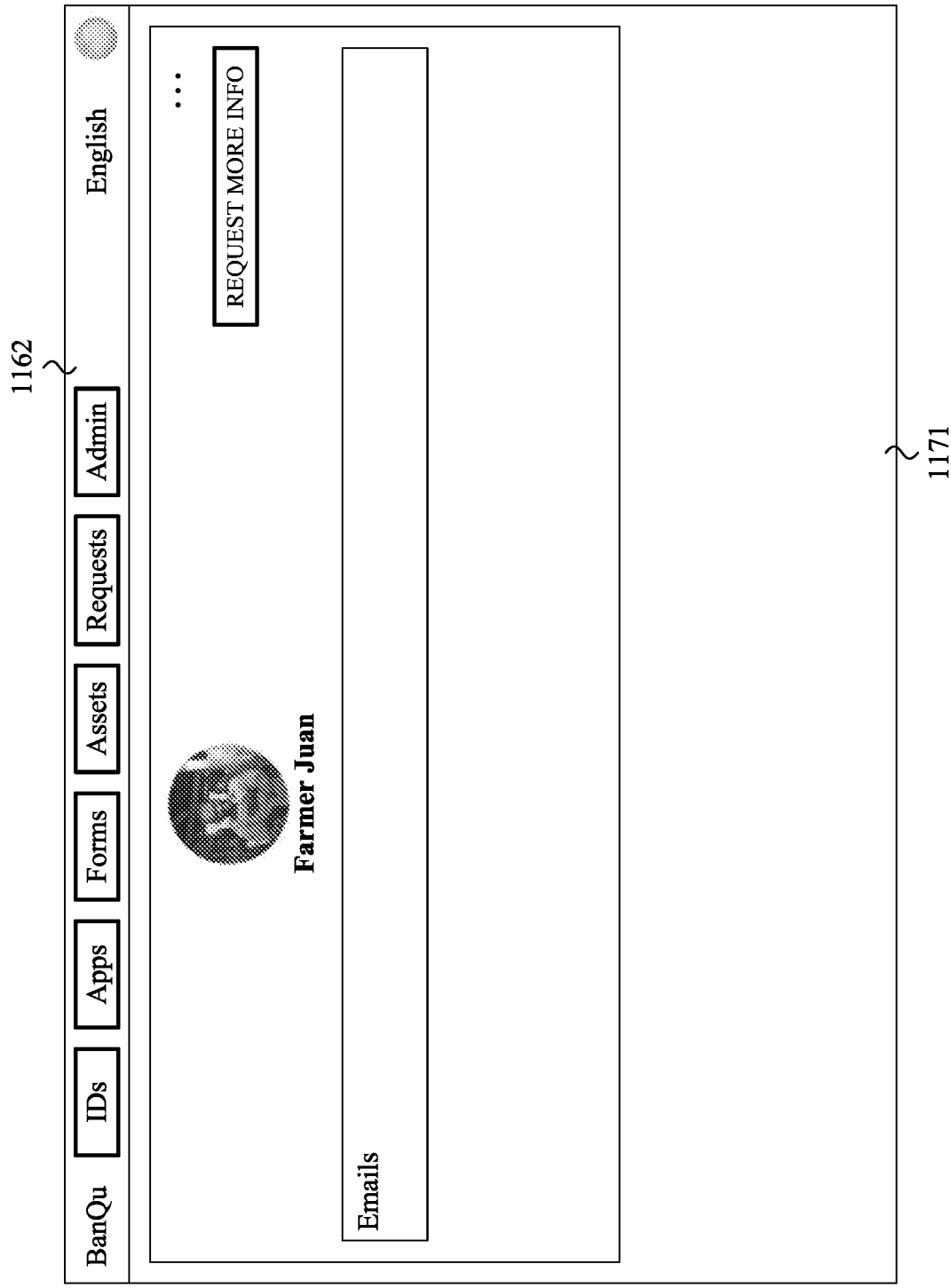
Figure 11I:

The screenshots (1160, 1170, 1180) in FIGS. 11g-11i show a series of pages (1161, 1171, 1181) of a UI of a DLTN client after another user (Coffee Company) has logged in. The top row (1162) of the respective pages includes graphical controls (drop-down menus) that can be actuated to reach menus or pages that show identities associated with the user, available applications, forms (defined by the user, or to be completed or reviewed by the user, or previously submitted by the user), assets of the user, requests from the user, and administrative settings. The top row (1162) also includes graphical indicators that indicate the language of the page (1161, 1171, 1181) and user who has logged in. The pages (1161, 1171) shown in FIGS. 11g and 11h show a connection (Farmer Juan) of the user along with shared user data (email addresses) of the connection. The page (1171) shown in FIG. 11h shows a graphical control that can be actuated to send a profile share request to the connection (Farmer Juan) to share user data ("Request More Info"). The screenshot (1180) in FIG. 11i shows a page (1181) after the user (Coffee Company) has actuated a graphical control to send a profile share request to the connection (Farmer Juan). The page (1181) lists categories of user data to be included in the profile share request. After the categories are selected by the user (Coffee Company), the profile share request is sent to the connection (Farmer Juan), who can review the request then approve or reject the request in the DLTN client (as explained with reference to FIG. 11e).

Figure 11J:
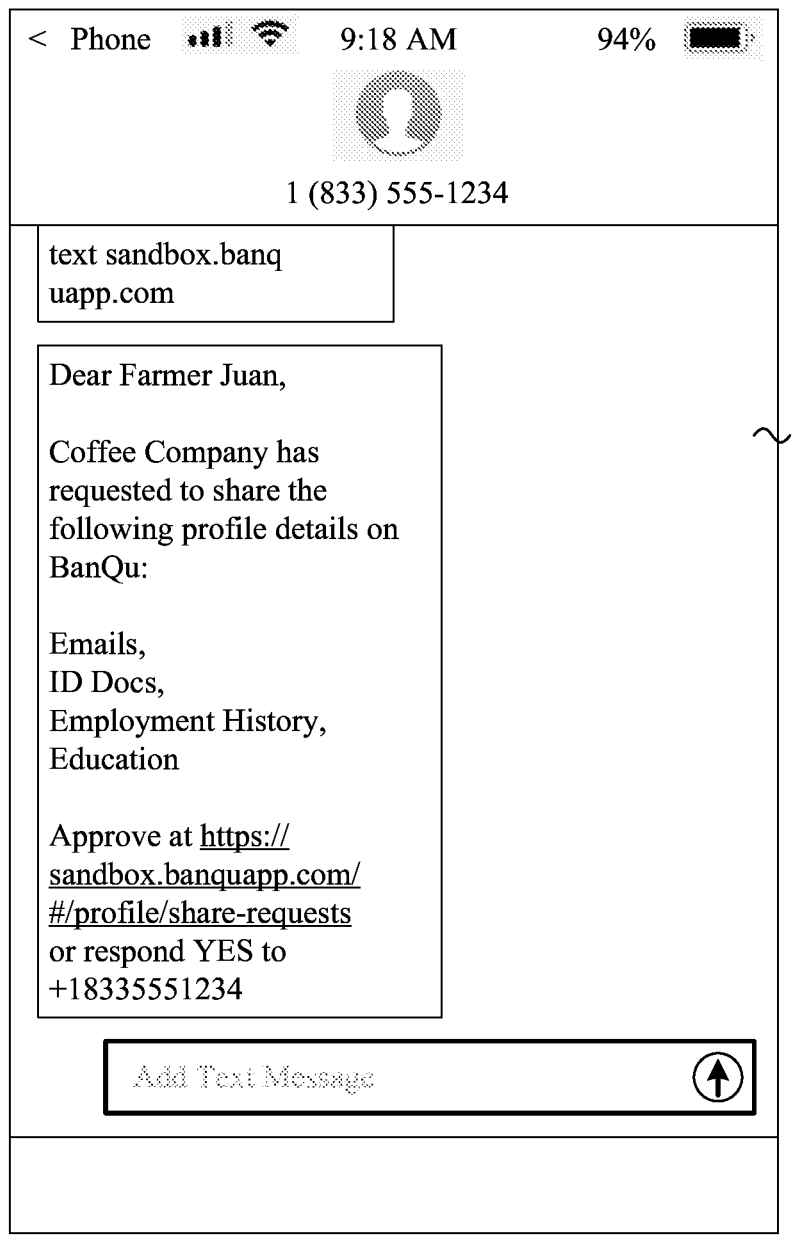

Finally, the screenshot (1190) in FIG. 11j shows a screen (1191) of a UI of a client messaging application after one user (Coffee Company) has sent a profile share request to another user (Farmer Juan) in an alternative channel. The screen (1191) shows a text message that includes a summary of the profile share request, the categories of user data that the sender (Coffee Company) would like the user (Farmer Juan) to share, and two options for the user to approve the request. The first option is a link, which the user can actuate to approve the request. The second option is a phone number, to which the user can send a short response ("YES") to approve the request.

The innovations described herein include, but are not limited to, the following.

| Updates to Permission Settings for User Data In a Blockchain |
| --- |

| | |
| --- | --- |
| A1 | In a computer system that implements a distributed ledger trust network ("DLTN") client configured to interoperate with a DLTN server to access a DLTN, a method comprising: sending, to the DLTN server, a request for permission settings for user data of a user; receiving, from the DLTN server, the permission settings; presenting, through a user interface of the DLTN client, the permission settings; receiving, through the user interface of the DLTN client, user input from the user indicating one or more updates to the permission settings; and sending, to the DLTN server, the one or more updates to the permission settings, the user data of the user being stored in a blockchain of the DLTN in association with identity of the user, the user data having been encrypted using a set of encryption keys that are user-specific and context-specific. |
| A2 | The method of A1, wherein the permission settings are received in encrypted form over a secure connection, and wherein the one or more updates to the permission settings are sent in encrypted form over the secure connection. |
| A3 | The method of A1, wherein the presenting the permission settings includes: displaying, through the user interface of the DLTN client, graphical controls operable to grant of access to respective categories of the user data of the user. |
| A4 | In a computer system that implements a distributed ledger trust network ("DLTN") server configured to provide access to a DLTN, a method comprising: receiving, from a DLTN client, a request for permission settings for user data of a user; retrieving the permission settings; sending, to the DLTN client, the permission settings; receiving, from the DLTN client, one or more updates to the permission settings; and based on the one or more updates to the permission settings, updating the permission settings, the user data of the user being stored in a blockchain of the DLTN in association with identity of the user, the user data having been encrypted using a set of encryption keys that are user-specific and context-specific. |
| A5 | The method of A4, further comprising: creating a Web page that includes any categories of the user data of the user that are publicly accessible; and sending, to the DLTN client, a link to the Web page. |
| A6 | The method of A4, wherein the permission settings are stored in encrypted form in storage accessible to an authentication service, the permission settings being encrypted and decrypted using a master key of the authentication service, and wherein the permission settings are enforceable by the authentication service in conjunction with one or more access rules. |
| A7 | The method of A4, wherein the permission settings are stored in encrypted form in the blockchain of the DLTN in association with the identity of the user, and wherein: the retrieving the permission settings includes searching the blockchain for the permission settings or requesting the permission settings from a service of the DLTN; and the updating the permission settings includes storing a new version of one or more of the permission settings in a new block in the blockchain. |

| | |
|---|---|
| A8 | The method of A4, further comprising, based on one of the one or more updates to the permission settings:<br>decrypting at least some of the user data of the user using a first encryption key among the set of encryption keys;<br>re-encrypting the at least some of the user data of the user using a second encryption key, different than the first encryption key, among the set of encryption keys; and<br>storing the re-encrypted user data of the user in a new block in the blockchain. |
| A9 | The method of any one of A1-A8, wherein the request for permission settings is part of a request to enroll the user, and wherein the one or more updates to the permission settings are changes to default, initial values for the permission settings. |
| A10 | The method of any one of A1-A8, wherein the request for permission settings is part of a request to review the permission settings, and wherein the one or more updates to the permission settings are changes to previously set values for the permission settings. |
| | Using Permission Settings to Check Requests to Review User Data in a Blockchain |
| B1 | In a computer system that implements a distributed ledger trust network ("DLTN") client configured to interoperate with a DLTN server to access a DLTN, a method comprising:<br>sending, to the DLTN server, a request from a reviewer to access user data of a user, the user data of the user being stored in a blockchain of the DLTN in association with identity of the user, the user data having been encrypted using a set of encryption keys that are user-specific and context-specific;<br>receiving, from the DLTN server, an indication that, according to permission settings for the user data of the user, access is not granted to the user data of the user; and<br>initiating a request, to the user, to approve access to the user data of the user. |
| B2 | The method of B1, further comprising:<br>displaying, through a user interface of the DLTN client, one or more graphical elements that indicate access is not granted to the user data of the user; and<br>receiving, through the user interface of the DLTN client, user input from the reviewer indicating the request to approve access to the user data of the user. |
| B3 | The method of B1, wherein the initiating the request includes:<br>sending, to the DLTN server or a server messaging application, an indication that the reviewer seeks approval by the user of access to the user data of the user. |
| B4 | In a computer system that implements a distributed ledger trust network ("DLTN") server configured to provide access to a DLTN, a method comprising:<br>receiving, from a DLTN client, a request to access user data of a user, the user data of the user being stored in a blockchain of the DLTN in association with identity of the user, the user data having been encrypted using a set of encryption keys that are user-specific and context-specific;<br>retrieving permission settings;<br>determining, based on the permission settings, that access is not granted for a reviewer to the user data of the user; and<br>sending, to the DLTN client, an indication that access is not granted for the reviewer to the user data of the user. |
| B5 | The method of B4, further comprising:<br>receiving, from the DLTN client, an indication that the reviewer seeks approval by the user of access to the user data of the user; and<br>sending, to a DLTN client of the user or a client messaging application of the user, a request for approval by the user of the reviewer to access user data of the user. |
| B6 | The method of B4, wherein the permission settings are stored in encrypted form in storage accessible to an authentication service, the permission settings being encrypted and decrypted using a master key of the authentication service, and wherein the permission settings are enforceable by the authentication service in conjunction with one or more access rules. |
| B7 | The method of B4, wherein the permission settings are stored in encrypted form in the blockchain of the DLTN in association with the identity of the user, and wherein:<br>the retrieving the permission settings includes searching the blockchain for the permission settings or requesting the permission settings from a service of the DLTN. |
| B8 | In a computer system that implements a client messaging application, a method comprising:<br>presenting, through a user interface of the client messaging application, a request for approval of a reviewer to access user data of a user, the user data of the user being stored in a blockchain of a distributed ledger trust network ("DLTN") in association with identity of the user, the user data having been encrypted using a set of encryption keys that are user-specific and context-specific;<br>receiving, through the user interface of the client messaging application, user input from the user that indicates approval of the request; and<br>sending, to a Web server or to a server messaging application, an indication of the approval of the request. |
| B9 | The method of B8, wherein the presenting the request includes:<br>displaying, through the user interface of the client messaging application, a text message that includes text describing the request, the text message further including one or more of a link to a Web page and a messaging number. |

| | |
|---|---|
| B10 | The method of B8, wherein the request includes a link to a Web page, and wherein the sending includes:<br>launching a Web browser; and<br>navigating to the Web page indicated in the link, thereby notifying the Web server of the approval of the request. |
| B11 | The method of B8, wherein the request includes a messaging number, and wherein the sending includes:<br>sending a text message to the messaging number, thereby notifying the server messaging application of the approval of the request. |
| B12 | In a computer system that implements a distributed ledger trust network ("DLTN") client configured to interoperate with a DLTN server to access a DLTN, a method comprising:<br>presenting, through a user interface of the DLTN client, a request for approval of a reviewer to access user data of a user, the user data of the user being stored in a blockchain of the DLTN in association with identity of the user, the user data having been encrypted using a set of encryption keys that are user-specific and context-specific;<br>receiving, through the user interface of the DLTN client, input that indicates approval or rejection of the request; and<br>sending, to the DLTN server, an indication of approval or rejection of the request. |
| B13 | The method of B12, wherein the presenting the request includes:<br>displaying, through the user interface of the DLTN client, graphical controls that are operable to indicate the approval or rejection of the request. |
| B14 | The method of B12, wherein the request received in encrypted form over a secure connection, and wherein the indication of approval or rejection is sent in encrypted form over the secure connection. |
| B15 | In a computer system that implements a distributed ledger trust network ("DLTN") server configured to provide access to a DLTN, a method comprising:<br>sending, to a DLTN client, a request for approval of a reviewer to access to user data of a user, the user data of the user being stored in a blockchain of the DLTN in association with identity of the user, the user data having been encrypted using a set of encryption keys that are user-specific and context-specific;<br>receiving, from the DLTN client, an indication of approval or rejection of the request; and<br>selectively updating the permission settings in the blockchain of the DLTN. |
| B16 | The method of B15, wherein the request sent in encrypted form over a secure connection, and wherein the indication of approval or rejection is received in encrypted form over the secure connection. |
| B17 | The method of B15, wherein the permission settings are stored in encrypted form in storage accessible to an authentication service. |
| B18 | The method of B15, wherein the permission settings are stored in encrypted form in the blockchain of the DLTN in association with the identity of the user, and wherein:<br>the selectively updating the permission settings includes storing a new version of one or more of the permission settings in a new block in the blockchain. |
| B19 | The method of B15, further comprising, based on the indication of approval or rejection of the request:<br>decrypting at least some of the user data of the user using a first encryption key among the set of encryption keys;<br>re-encrypting the at least some of the user data of the user using a second encryption key, different than the first encryption key, among the set of encryption keys; and<br>storing the re-encrypted user data of the user in a new block in the blockchain. |

Revocation of Permission to Access User Data in a Blockchain

| | |
|---|---|
| C1 | In a computer system that implements a distributed ledger trust network ("DLTN") client configured to interoperate with a DLTN server to access a DLTN, a method comprising:<br>presenting, through a user interface of the DLTN client, a previously-approved request to grant access to user data of a user, the user data of the user being stored in a blockchain of the DLTN in association with identity of the user, the user data having been encrypted using a set of encryption keys that are user-specific and context-specific;<br>receiving, through the user interface of the DLTN client, input that indicates revocation of the previously-approved request; and<br>sending, to the DLTN server, an indication of revocation of the previously-approved request. |
| C2 | The method of C1, wherein the presenting the previously-approved request includes:<br>displaying, through the user interface of the DLTN client, graphical controls that are operable to indicate the revocation of the previously-approved request. |
| C3 | The method of C1, wherein the previously-approved request received in encrypted form over a secure connection, and wherein the indication of revocation of the previously-approved request is sent in encrypted form over the secure connection. |

-continued

| | |
|---|---|
| C4 | In a computer system that implements a distributed ledger trust network ("DLTN") server configured to provide access to a DLTN, a method comprising:<br>sending, to a DLTN client, a previously-approved request from a reviewer to grant access to user data of a user, the user data of the user being stored in a blockchain of the DLTN in association with identity of the user, the user data having been encrypted using a set of encryption keys that are user-specific and context-specific;<br>receiving, from the DLTN client, an indication of revocation of the previously-approved request; and<br>updating the permission settings. |
| C5 | The method of C4, wherein the previously-approved request sent in encrypted form over a secure connection, and wherein the indication of revocation of the previously-approved request is received in encrypted form over the secure connection. |
| C6 | The method of C4, wherein the permission settings are stored in encrypted form in storage accessible to an authentication service. |
| C7 | The method of C4, wherein the permission settings are stored in encrypted form in the blockchain of the DLTN in association with the identity of the user, and wherein:<br>the updating the permission settings includes storing a new version of one or more of the permission settings in a new block in the blockchain. |
| C8 | The method of C4, further comprising, based on the indication of revocation of the previously-approved request:<br>decrypting at least some of the user data of the user using a first encryption key among the set of encryption keys;<br>re-encrypting the at least some of the user data of the user using a second encryption key, different than the first encryption key, among the set of encryption keys; and<br>storing the re-encrypted user data of the user in a new block in the blockchain. |

Alternatives and Variations

| | |
|---|---|
| D1 | The method of any one of A1-A10, B1-B19, and C1-C8, wherein the one or more updates to the permission settings include:<br>a grant of access to at least some of the user data of the user; and/or<br>a revocation of access to at least some of the user data of the user. |
| D2 | The method of any one of A1-A10, B1-B19, and C1-C8, wherein the user data is a subset of available user data of the user, the subset including one or more categories of the user data of the user. |
| D3 | The method of any one of A1-A10, B1-B19, and C1-C8, wherein the permission settings include:<br>group permission settings that control private access, by a group of one or more connected users through the DLTN, to the user data of the user;<br>individual permission settings that control private access, per connected user through the DLTN, to the user data of the user; and/or<br>public permission settings that control public access, over the Internet, to the user data of the user. |
| D4 | The method of any one of A1-A10, B1-B19, and C1-C8, wherein the permission settings include:<br>category-specific permission settings that control grant of access to respective categories of the user data of the user; and/or<br>global permission settings that control grant of access to all of the user data of the user. |
| D5 | The method of any one of A1-A10, B1-B19, and C1-C8, wherein the permission settings include:<br>one or more timed permission settings that control grant of access to the user data of the user before an expiration time. |
| D6 | The method of any one of A1-A10, B1-B19, and C1-C8, wherein the user data includes one or more of:<br>contact information for the user;<br>identification documents for the user;<br>citizenship of the user;<br>employment history of the user;<br>education history of the user;<br>dependents of the user;<br>connections of the user;<br>assets of the user; and<br>one or more transactions to which the user has been a party. |
| D7 | The method of any one of A1-A10, B1-B19, and C1-C8, wherein the blockchain is a private blockchain, and wherein the DLTN server manages access to the private blockchain. |
| D8 | The method of any one of A1-A10, B1-B19, and C1-C8, wherein the blockchain includes one or more blocks, and wherein a given block among the one or more blocks of the blockchain includes:<br>a hash value based on one or more previous blocks in the blockchain;<br>a key identifier;<br>a type;<br>user data of a given user; and<br>a user identifier of the given user. |
| D9 | The method of any one of A1-A10, B1-B19, and C1-C8, wherein the DLTN uses Ethereum. |

| | |
|---|---|
| D10 | The method of any one of A1-A10, B1-B19, and C1-C8, wherein:<br>the DLTN server includes a Web application and implements an application programming interface ("API") accessible to the DLTN client; and<br>the DLTN client is implemented as a separate executable application, as client-side scripting logic executing in a Web browser environment, or as a set of functions of a Web browser to control client-facing scripting logic executed by the DLTN server. |
| D11 | The method of any one of A1-A10, B1-B19, and C1-C8, wherein the DLTN server executes in a public sub-network of a cloud computing service. |
| D12 | The method of D11, wherein the DLTN server is configured to call an authentication service and an encryption service that execute in an isolated sub-network of the cloud computing service. |
| D13 | The method of D11, wherein the DLTN server is configured to call one or more nodes of the DLTN that execute in an isolated sub-network of the cloud computing service. |
| D14 | The method of any one of A1-A10, B1-B19, and C1-C8, further comprising performing operations to log in to the DLTN, including:<br>with the DLTN client:<br>providing credentials to the DLTN server; and<br>receiving, from the DLTN server, an authentication token; or<br>with the DLTN server:<br>receiving credentials;<br>validating the credentials; and<br>sending, to the DLTN client, an authentication token. |

Alternate Formats

| | |
|---|---|
| E1 | One or more computer-readable media having stored therein computer-executable instructions for causing a computer system, when programmed thereby, to perform the method of any one of A1-A10, B1-B19, C1-C8, and D1-D14. |
| E2 | A computer system configured to perform the method of any one of A1-A10, B1-B19, C1-C8, and D1-D14. |

The foregoing description discloses only examples. Modifications which fall within the scope of the invention will be readily apparent to those of ordinary skill in the art. In view of the many possible examples to which the principles of the disclosed invention may be applied, it should be recognized that the illustrated examples are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored therein computer-executable instructions for causing a computer system that implements a distributed ledger trust network ("DLTN") server, when programmed thereby, to perform operations to provide access to a DLTN, the operations comprising:
receiving, from a DLTN client, a request for permission settings for user data of a user;
retrieving the permission settings;
sending, to the DLTN client, the permission settings;
receiving, from the DLTN client, one or more updates to the permission settings; and
based on the one or more updates to the permission settings, updating the permission settings, the user data of the user being stored in a blockchain of the DLTN in association with identity of the user, the user data having been encrypted using a set of encryption keys that are user-specific and context-specific, wherein the set of encryption keys is one of multiple sets of encryption keys specific to the user, each of the multiple sets of encryption keys being associated with a different context that is a different data category or different subset of other users, and wherein the permission settings, depending on the different contexts, respectively, control access to the multiple sets of encryption keys.

2. The one or more non-transitory computer-readable media of claim 1, wherein the operations further comprise:
creating a Web page that includes any categories of the user data of the user that are publicly accessible; and
sending, to the DLTN client, a link to the Web page.

3. The one or more non-transitory computer-readable media of claim 1, wherein the permission settings are stored in encrypted form in storage accessible to an authentication service, the permission settings being encrypted and decrypted using a master key of the authentication service, and wherein the permission settings are enforceable by the authentication service in conjunction with one or more access rules.

4. The one or more non-transitory computer-readable media of claim 1, wherein the permission settings are stored in encrypted form in the blockchain of the DLTN in association with the identity of the user, and wherein:
the retrieving the permission settings includes searching the blockchain for the permission settings or requesting the permission settings from a service of the DLTN; and
the updating the permission settings includes storing a new version of one or more of the permission settings in a new block in the blockchain.

5. The one or more non-transitory computer-readable media of claim 1, wherein the operations further comprise, based on one of the one or more updates to the permission settings:
decrypting at least some of the user data of the user using a first encryption key among the set of encryption keys;
re-encrypting the at least some of the user data of the user using a second encryption key, different than the first encryption key; and
storing the re-encrypted user data of the user in a new block in the blockchain.

6. The one or more non-transitory computer-readable media of claim 1, wherein the request for permission settings is part of a request to enroll the user, and wherein the one or more updates to the permission settings are changes to default, initial values for the permission settings.

7. The one or more non-transitory computer-readable media of claim 1, wherein the request for permission settings is part of a request to review the permission settings, and wherein the one or more updates to the permission settings are changes to previously set values for the permission settings.

8. The one or more non-transitory computer-readable media of claim 1, wherein the one or more updates to the permission settings include one of:
   a grant of access to at least some of the user data of the user; and
   a revocation of access to at least some of the user data of the user.

9. The one or more non-transitory computer-readable media of claim 1, wherein the blockchain is a private blockchain, and wherein the DLTN server manages access to the private blockchain.

10. The one or more non-transitory computer-readable media of claim 1, wherein:
    the DLTN server includes a Web application and implements an application programming interface ("API") accessible to the DLTN client; and
    the DLTN client is implemented as a separate executable application, as client-side scripting logic executing in a Web browser environment, or as a set of functions of a Web browser to control client-facing scripting logic executed by the DLTN server.

11. A computer-implemented method, in a computer system that implements a distributed ledger trust network ("DLTN") server configured to provide access to a DLTN, the method comprising:
    receiving, from a DLTN client, a request to access user data of a user, the user data of the user being stored in a blockchain of the DLTN in association with identity of the user, the user data having been encrypted using a set of encryption keys that are user-specific and context-specific, wherein the set of encryption keys is one of multiple sets of encryption keys specific to the user, each of the multiple sets of encryption keys being associated with a different context that is a different data category or different subset of other users;
    retrieving permission settings for the user data of the user, wherein the permission settings, depending on the different contexts, respectively, control access to the multiple sets of encryption keys;
    determining, based on the permission settings, that access is not granted for a reviewer to the user data of the user; and
    sending, to the DLTN client, an indication that access is not granted for the reviewer to the user data of the user.

12. The method of claim 11, further comprising:
    receiving, from the DLTN client, an indication that the reviewer seeks approval by the user of access to the user data of the user; and
    sending, to a DLTN client of the user or a client messaging application of the user, a request for approval by the user of the reviewer to access user data of the user.

13. The method of claim 11, wherein the permission settings are stored in encrypted form in storage accessible to an authentication service, the permission settings being encrypted and decrypted using a master key of the authentication service, and wherein the permission settings are enforceable by the authentication service in conjunction with one or more access rules.

14. The method of claim 11, wherein the permission settings are stored in encrypted form in the blockchain of the DLTN in association with the identity of the user, and wherein:
    the retrieving the permission settings includes searching the blockchain for the permission settings or requesting the permission settings from a service of the DLTN.

15. The method of claim 11, further comprising:
    sending, to another DLTN client, a request for approval of the reviewer to access to the user data of the user;
    receiving, from the other DLTN client, an indication of approval or rejection of the request for approval; and
    selectively updating the permission settings in the blockchain of the DLTN.

16. The method of claim 15, wherein the request for approval is sent in encrypted form over a secure connection, and wherein the indication of approval or rejection is received in encrypted form over the secure connection.

17. The method of claim 15, further comprising, based on the indication of approval or rejection of the request:
    decrypting at least some of the user data of the user using a first encryption key among the set of encryption keys;
    re-encrypting the at least some of the user data of the user using a second encryption key, different than the first encryption key; and
    storing the re-encrypted user data of the user in a new block in the blockchain.

18. A computer system comprising memory and one or more processing units, wherein the computer system implements a distributed ledger trust network ("DLTN") server configured to perform operations comprising:
    sending, to a DLTN client, a previously-approved request from a reviewer to grant access to user data of a user, the user data of the user being stored in a blockchain of a DLTN in association with identity of the user, the user data having been encrypted using a set of encryption keys that are user-specific and context-specific, wherein the set of encryption keys is one of multiple sets of encryption keys specific to the user, each of the multiple sets of encryption keys being associated with a different context that is a different data category or different subset of other users;
    receiving, from the DLTN client, an indication of revocation of the previously-approved request; and
    updating permission settings for the user data of the user, wherein the permission settings, depending on the different contexts, respectively, control access to the multiple sets of encryption keys.

19. The computer system of claim 18, wherein the previously-approved request is sent in encrypted form over a secure connection, and wherein the indication of revocation of the previously-approved request is received in encrypted form over the secure connection.

20. The computer system of claim 18, wherein the permission settings are stored in encrypted form in storage accessible to an authentication service.

21. The computer system of claim 18, wherein the permission settings are stored in encrypted form in the blockchain of the DLTN in association with the identity of the user, and wherein:
    the updating the permission settings includes storing a new version of one or more of the permission settings in a new block in the blockchain.

22. The computer system of claim 18, the operations further comprising, based on the indication of revocation of the previously-approved request:

decrypting at least some of the user data of the user using a first encryption key among the set of encryption keys;

re-encrypting the at least some of the user data of the user using a second encryption key, different than the first encryption key; and storing the re-encrypted user data of the user in a new block in the blockchain.

23. The computer system of claim 18, wherein the user data of the user that is stored in the blockchain includes biographical data for the user, contact data for the user, identification documents for the user, geo-location data for the user, asset data for the user, and transaction data for transactions involving the user as a party, wherein the user is an individual, small business, large business, bank, non-profit organization, or other entity, and wherein none of the user data of the user is stored in a central database separate from the blockchain.

24. The one or more non-transitory computer-readable media of claim 1, wherein the user data of the user that is stored in the blockchain includes biographical data for the user, contact data for the user, identification documents for the user, geo-location data for the user, asset data for the user, and transaction data for transactions involving the user as a party, wherein the user is an individual, small business, large business, bank, non-profit organization, or other entity, and wherein none of the user data of the user is stored in a central database separate from the blockchain.

25. The method of claim 11, wherein the user data of the user that is stored in the blockchain includes biographical data for the user, contact data for the user, identification documents for the user, geo-location data for the user, asset data for the user, and transaction data for transactions involving the user as a party, wherein the user is an individual, small business, large business, bank, non-profit organization, or other entity, and wherein none of the user data of the user is stored in a central database separate from the blockchain.

* * * * *